US011037002B2

United States Patent
Kompalli et al.

(10) Patent No.: US 11,037,002 B2
(45) Date of Patent: Jun. 15, 2021

(54) CALIBRATION OF FIXED IMAGE-CAPTURING DEVICE FOR DEPTH ESTIMATION

(71) Applicant: ANI TECHNOLOGIES PRIVATE LIMITED, Bengaluru (IN)

(72) Inventors: Pramod Sankar Kompalli, Bengaluru (IN); Sathya Narayanan Nagarajan, Bengaluru (IN); Apurv Nigam, Unnao (IN); Srikanth Vidapanakal, Bengaluru (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 55 days.

(21) Appl. No.: 16/453,451

(22) Filed: Jun. 26, 2019

(65) Prior Publication Data
US 2020/0257907 A1 Aug. 13, 2020

(30) Foreign Application Priority Data

Feb. 8, 2019 (IN) .............................. 201941005110

(51) Int. Cl.
*G06K 9/00* (2006.01)
*G06T 7/55* (2017.01)
(Continued)

(52) U.S. Cl.
CPC ....... *G06K 9/00798* (2013.01); *G06K 9/4604* (2013.01); *G06T 7/13* (2017.01); *G06T 7/55* (2017.01)

(58) Field of Classification Search
CPC ............. G06K 9/00798; G06K 9/4604; G06K 9/00785; G06K 9/00791; G06K 9/00832; G06K 2209/23; G06T 7/55; G06T 7/13; G06T 2207/30252; G06T 7/80; G06T 2207/10024; G06T 7/536;
(Continued)

(56) References Cited

U.S. PATENT DOCUMENTS 6,819,779 B1  11/2004 Nichani
2018/0165822 A1  6/2018 Uliyar et al.
(Continued)

FOREIGN PATENT DOCUMENTS

CN  108235777 A  6/2018

OTHER PUBLICATIONS

Mahdi Mirzabaki, A New Method for Depth Detection Using Interpolation Functions, Azad University of Tabriz, Computer Engineering Departement, Faculty of Engineering, Iran, Tabriz.
(Continued)

*Primary Examiner* — Dhaval V Patel
(74) *Attorney, Agent, or Firm* — Chip Law Group

(57) ABSTRACT

Calibration and distance prediction for driving assistance is provided. A camera of a vehicle is calibrated to obtain a distance data set. The distance data set includes a distance of each row of pixels of a first image captured by the camera. The distance data set may be further utilized in real-time to predict a distance of an object from the vehicle. Based on the predicted distance, a warning message for an impending collision may be generated and communicated to a driver of the vehicle, thereby facilitating driving assistance to the driver in the real-time.

20 Claims, 13 Drawing Sheets

(51) Int. Cl.
*G06T 7/13* (2017.01)
*G06K 9/46* (2006.01)

(58) Field of Classification Search
CPC . G06T 2207/30236; G06T 2207/30248; G06T 2207/30268; G06T 2207/30264; G06T 2207/30261; G06T 2207/30256; A61B 5/18; B60R 21/01538; G01C 21/3602
See application file for complete search history.

(56) References Cited

U.S. PATENT DOCUMENTS

| | | | |
|---|---|---|---|
| 2020/0118283 A1* | 4/2020 | Lee | G06T 7/70 |
| 2020/0180656 A1* | 6/2020 | Kim | G06K 9/00825 |
| 2020/0217656 A1* | 7/2020 | Tang | G01C 3/10 |
| 2020/0238991 A1* | 7/2020 | Aragon | B60R 1/00 |

OTHER PUBLICATIONS

R. Hartley and A. Zisserman, Multiple View Geometry in Computer Vision, Cambridge University Press, New York, NY, USA, 2 edition, 2003.
A. G. Howard, M. Zhu, B. Chen, D. Kalenichenko, W. Wang, T. Weyand, M. Andreetto, and H. Adam, Mobilenets: E_cient convolutional neural networks for mobile vision applications, Google Inc.
W. Liu, D. Anguelov, D. Erhan, C. Szegedy, S. E. Reed, C. Fu, and A. C. Berg, SSD: single shot multibox detector.

* cited by examiner

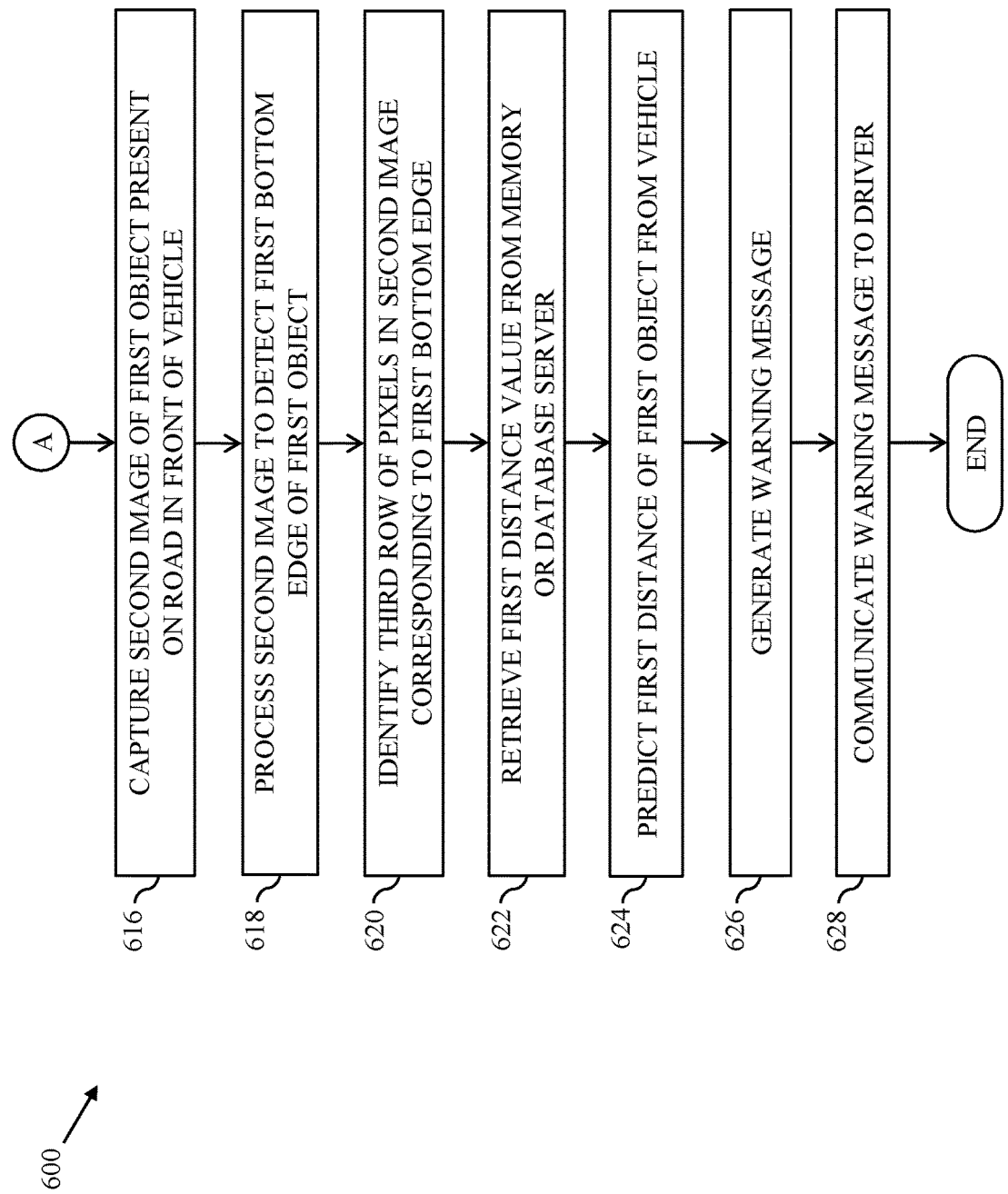

CALIBRATION OF FIXED IMAGE-CAPTURING DEVICE FOR DEPTH ESTIMATION

CROSS-RELATED APPLICATIONS

This application claims priority of Indian Application Serial No. 201941005110, filed Feb. 8, 2019, the contents of which are incorporated herein by reference.

FIELD

Various embodiments of the disclosure relate generally to driving assistance systems. More specifically, various embodiments of the disclosure relate to calibration of a fixed image-capturing device for depth estimation.

BACKGROUND

Advancements in the field of automobiles along with a continuously increasing demand for personal and commercial vehicles have vastly increased the number of vehicles that are plying along various roads on a daily basis, thus increasing the traffic density. The increased traffic density of traffic on the roads has resulted in a rapid rise in the number of collisions of the vehicles with stationary or moving objects. Thus, driving a vehicle is becoming a complex procedure, especially along roads with the dense traffic. While driving through the dense traffic, a driver of the vehicle can encounter critical situations that the driver is unable to solve quickly and thus can cause accident. Hence, to avoid such accidents, it is imperative for the driver to be aware of the possible critical situations well in advance. In one possible solution, the proximity of near-by objects (such as other vehicles, trees, pedestrians, and the like) is estimated and communicated to the driver for providing driving assistance while driving the vehicle. To facilitate providing the driving assistance to the driver, the vehicle is equipped with various proximity sensors that detect presence of the near-by objects and estimate distances of each near-by object from the vehicle. However, the use of proximity sensors has its own limitations. The proximity sensors are typically range-specific and thus are not effective all the time. Further, an angle of coverage of a proximity sensor is typically small (e.g., 5°-15°). Hence, to ensure an entire coverage of the vehicle's path, multiple proximity sensors are installed on the vehicle, which may not desirable due to increase in cost and complexity.

One conventional approach to solve the above-mentioned problems is to use a camera installed on the vehicle to estimate the distances of the near-by objects from the vehicle. This conventional approach estimates the distance of a near-by object from the vehicle based on a ratio between observed dimensions of the object in an image captured by the camera and actual dimensions of the object. However, with such approach, actual dimensions of various objects should be known beforehand, which may not be feasible all the time.

In light of the foregoing, there exists a need for a technical and reliable solution that overcomes the above-mentioned problems, challenges, and short-comings, and manages depth estimation of various objects for facilitating driving assistance to drivers of vehicles in a manner that may offer reliable and enhanced experiences to the drivers.

SUMMARY

Calibration of a fixed image-capturing device for depth estimation is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

FIGS. 6A and 6B illustrate a flow chart of a method for predicting distance of an object from the vehicle, in accordance with an exemplary embodiment of the disclosure;

DETAILED DESCRIPTION

Figure 1:
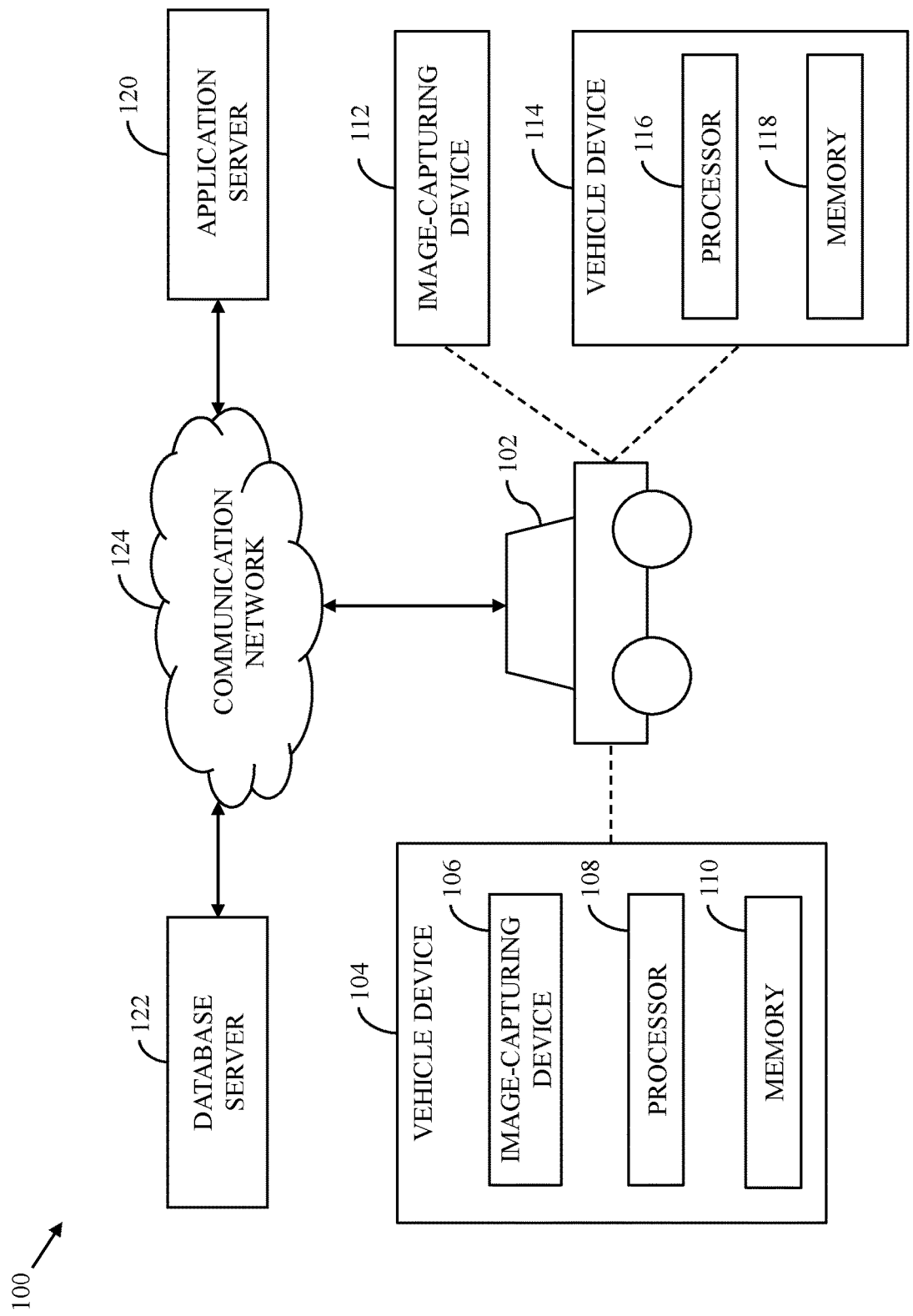
FIG. 1 is a block diagram that illustrates an environment for calibration of fixed image-capturing devices of vehicles for depth estimation, in accordance with an exemplary embodiment of the disclosure.

Certain embodiments of the disclosure may be found in a disclosed apparatus for calibration of a fixed image-capturing device of a vehicle for depth estimation. Exemplary aspects of the disclosure provide a method and a system for calibrating the fixed image-capturing device of the vehicle and predicting a distance of an object from the vehicle. The method includes one or more operations that are executed by circuitry of the disclosed apparatus to perform calibration of the fixed image-capturing device. The circuitry may be configured to identify a first plurality of rows of pixels in a first image. The first image may be captured by the image-capturing device. The first image may include a plurality of lines. A first line of the plurality of lines is at a known distance from a second line of the plurality of lines. The first plurality of rows of pixels may correspond to the plurality of lines. The circuitry may be further configured to estimate a first distance and a second distance of the first line and the second line, respectively, from the image-capturing device. The first and second distances are estimated based on at least the known distance, a first width of the first line in the first image, and a second width of the second line in the first image. The circuitry may be further configured to estimate a third distance of a third line corresponding to each row of pixels of a second plurality of rows of pixels in the first image from the image-capturing device. The third distance may be estimated based on at least a focal length of the image-capturing device and a third width of the third line corresponding to each row of pixels. The third width may be estimated based on at least the plurality of lines and each row of pixels. The first image may comprise the first plurality of rows of pixels and the second plurality of rows of pixels. The circuitry may be further configured to store a distance data set including at least the first distance, the second distance, and the third distance in a memory. Further, a fourth distance of a first object from a second object may be predicted based on the stored distance data set and a second image of the first object.

Another exemplary aspect of the disclosure provides a method and a system for predicting a distance of an object from a vehicle. The method includes one or more operations that are executed by a vehicle device installed in the vehicle. In one embodiment, the vehicle device may include circuitry such as an image-capturing device, a processor, and a memory. In another embodiment, the vehicle device may only include circuitry such as a processor and a memory, and the image-capturing device and the vehicle device may be separate from each other. In an embodiment, the image-capturing device may be configured to capture a first image of a first object. The processor may be configured to detect a bottom edge of the first object based on the first image. The processor may be further configured to identify a first row of pixels in the first image corresponding to the detected bottom edge. The processor may be further configured to predict a first distance of the first object from the vehicle based on a distance value retrieved from a distance data set that may be stored in the memory of the vehicle device or a separate memory device installed in the vehicle. The distance value may be retrieved from the distance data set based on at least the first row of pixels.

The distance data set may be estimated by executing one or more calibration operations. For example, a second plurality of rows of pixels in a second image including a plurality of lines may be identified. The second plurality of rows of pixels may correspond to the plurality of lines. A first line of the plurality of lines may be a known distance from a second line of the plurality of lines. Further, a second distance and a third distance of the first line and second line, respectively, from a second object may be estimated. The second distance and the third distance are estimated based on at least the known distance, a first width of the first line in the second image, and a second width of the second line in the second image.

Further, the distance data set for a third line corresponding to each row of pixels of a third plurality of rows of pixels in the second image may be estimated based on at least a third width of the third line corresponding to each of the third plurality of rows of pixels and one of the first line or the second line. Each distance value in the distance data set may indicate a distance of the third line corresponding to each row of pixels of the third plurality of rows of pixels from the second object. The third width may be estimated based on at least the plurality of lines and each row of pixels of the third plurality of rows of pixels. The distance data set may further include at least the second distance and the third distance. The second image may comprise the second plurality of rows of pixels and the third plurality of rows of pixels. The retrieved distance value may be associated with a fourth row of pixels in the second image having a row number that is equal to a row number of the first row of pixels in the first image. Upon prediction of the distance of the first object from the vehicle, the processor may be configured to generate a warning message based on at least the predicted distance. The processor may be further configured to communicate the warning message to a driver of the vehicle indicating an impending collision.

Thus, various methods and systems of the disclosure facilitate calibration of a fixed image-capturing device of a vehicle to obtain distance data set that is further utilized to predict a distance of a first object from the vehicle in real-time. The distance data set may be obtained by identifying a plurality of rows of pixels and determining corresponding distances by utilizing line correspondences of a plurality of lines on a ground plane. The plurality of lines may be mapped to a plurality of rows of pixels in an image captured by the fixed image-capturing device during the calibration of the fixed image-capturing device. Thus, the accuracy of identification of the plurality rows of pixels and determination of the distance data set may be higher as compared to conventional distance prediction approaches that use point correspondences. Further, since distances of the distance data set may be estimated based on the plurality of lines on the ground plane, and distances of various objects (such as the first object) from the vehicle may be predicted based on the distance data set, a beforehand need for knowing actual dimensions of the various objects is eliminated. Thus, the various methods and systems of the disclosure facilitate an efficient, effective, and accurate way of identifying various obstacles, predicting distances of each obstacle, and notifying a driver of the vehicle of an impending collision, if any, well in advance.

FIG. 1 is a block diagram that illustrates an environment 100 for calibration of fixed image-capturing devices of vehicles for depth estimation, in accordance with an exemplary embodiment of the disclosure. The environment 100 includes a vehicle 102, a vehicle device 104 including an image-capturing device 106, a processor 108, and a memory 110, an image-capturing device 112, a vehicle device 114 including a processor 116 and a memory 118, an application server 120, and a database server 122 that communicate with each other via a communication network 124.

In an embodiment, the vehicle 102 may include a distance prediction mechanism. The distance prediction mechanism may facilitate detection of a first object in front of the vehicle 102 and prediction of a first distance of the first object from the vehicle 102. Examples of the first object may include, but are not limited to, a pedestrian, an animal, a vehicle, a road-divider, a non-drivable area, a rock, a road sign, a building, and a tree. For facilitating prediction of the first distance in real-time, the distance prediction mechanism may be calibrated. Thus, the vehicle 102 may be subjected to a calibration phase (in which the distance prediction mechanism may be calibrated) and an implementation phase (in which the distance prediction mechanism may predict the first distance based on the calibration). In an embodiment, the distance prediction mechanism may be realized or implemented by the vehicle device 104 including the image-capturing device 106, the processor 108, and the memory 110. In another embodiment, the distance prediction mechanism may be realized or implemented by a combination of the image-capturing device 112 and the vehicle device 114 including the processor 116 and the memory 118. Here, the image-capturing device 112 and the vehicle device 114 are separate devices installed in the vehicle 102. In another embodiment, the distance prediction mechanism may be realized or implemented by a combination of the image-capturing device 106 or 112, the application server 120, and the database server 122.

The vehicle 102 is a mode of transportation that is used by a user to commute from one location to another location. In an embodiment, the vehicle 102 may be owned by the user. In another embodiment, the vehicle 102 may be owned by a vehicle service provider for offering on-demand vehicle or ride services to one or more passengers (e.g., the user). The vehicle 102 may include one or more vehicle devices such as the vehicle device 104 or the vehicle device 114. Examples of the vehicle 102 include, but are not limited to, an automobile, a bus, a car, an auto-rickshaw, and a bike.

The vehicle device 104 may include suitable logic, circuitry, interfaces, and/or code, executable by the circuitry, that may be configured to perform one or more operations. The vehicle device 104 may be a computing device that is installed in the vehicle 102. Examples of the vehicle device 104 may include, but are not limited to, a mobile phone, a tablet, a laptop, a vehicle head unit, or any other portable communication device that is placed inside the vehicle 102. The vehicle device 104 may be realized through various web-based technologies such as, but not limited to, a Java web-framework, a .NET framework, a PHP (Hypertext Preprocessor) framework, or any other web-application framework. The vehicle device 104 may be further realized through various embedded technologies such as, but not limited to, microcontrollers or microprocessors that are operating on one or more operating systems such as Windows, Android, Unix, Ubuntu, Mac OS, or the like.

In an embodiment, the vehicle device 104 may be installed on a front windshield (shown in FIGS. 2A and 3A) of the vehicle 102. Further, the vehicle device 104 may be installed such that the image-capturing device 106 is positioned at a center of the front windshield and may be oriented to face outside the vehicle 102 for capturing various objects (such as the first object) present in front of the vehicle 102. In another embodiment, the vehicle device 104 may be installed behind the front windshield of the vehicle 102. Further, the vehicle device 104 may be installed such that the image-capturing device 106 is positioned at a center of the front windshield and may be oriented to face outside the vehicle 102 for capturing the various objects (such as the first object) present in front of the vehicle 102. In another embodiment, the vehicle device 104 may be installed on a rear windshield (not shown) of the vehicle 102. Further, the vehicle device 104 may be installed such that the image-capturing device 106 is positioned at a center of the rear windshield and may be oriented to face outside the vehicle 102 for capturing the various objects present behind the vehicle 102.

In an embodiment, the vehicle device 104 may be calibrated in the calibration phase. Based on the calibration, the vehicle device 104 may be configured to predict the first distance of the first object from the vehicle 102 in the implementation phase. The vehicle device 104 may be configured to execute the calibration and implementation phases by utilizing the image-capturing device 106, the processor 108, and the memory 110. The image-capturing device 106, the processor 108, and the memory 110 may communicate with each other via a first communication bus (not shown).

The image-capturing device 106 may include suitable logic, circuitry, interfaces, and/or code, executable by the circuitry, that may be configured to perform one or more operations. For example, the image-capturing device 106 may be an optical instrument that includes one or more image sensors for recording or capturing a set of images. The set of images may be individual still photographs or a sequence of images constituting a video. In an embodiment, the image-capturing device 106 may be a red, green, and blue (RGB) camera. Thus, the set of images (captured by the image-capturing device 106) may be associated with an RGB color model. However, a person having ordinary skill in the art would understand that the scope of the disclosure is not limited to this specific scenario in which the image-capturing device 106 may be configured to capture the set of images associated with the RGB color model. In various other embodiments, the set of images captured by the image-capturing device 106 may be associated with a different color model such as a black and white color model, a greyscale color model, a hue, saturation, and value (HSV) color model, a cyan, magenta, yellow, and black (CMYK) color model, a hue, saturation, and brightness (HSB) color model, a hue, saturation, and lightness (HSL) color model, a hue, chroma, and value (HCV) color model, or the like.

Figure 3B:
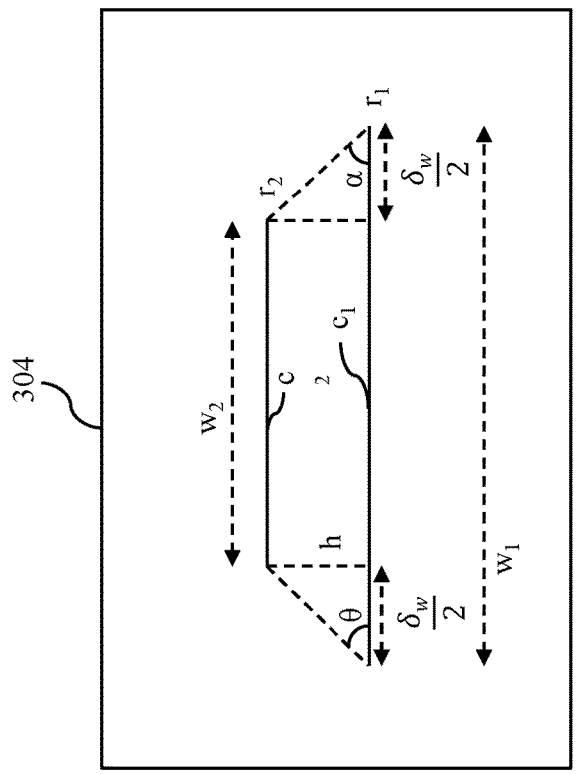
FIG. 3B illustrates a first image captured by the image-capturing device, in accordance with an exemplary embodiment of the disclosure.
Figure 3A:
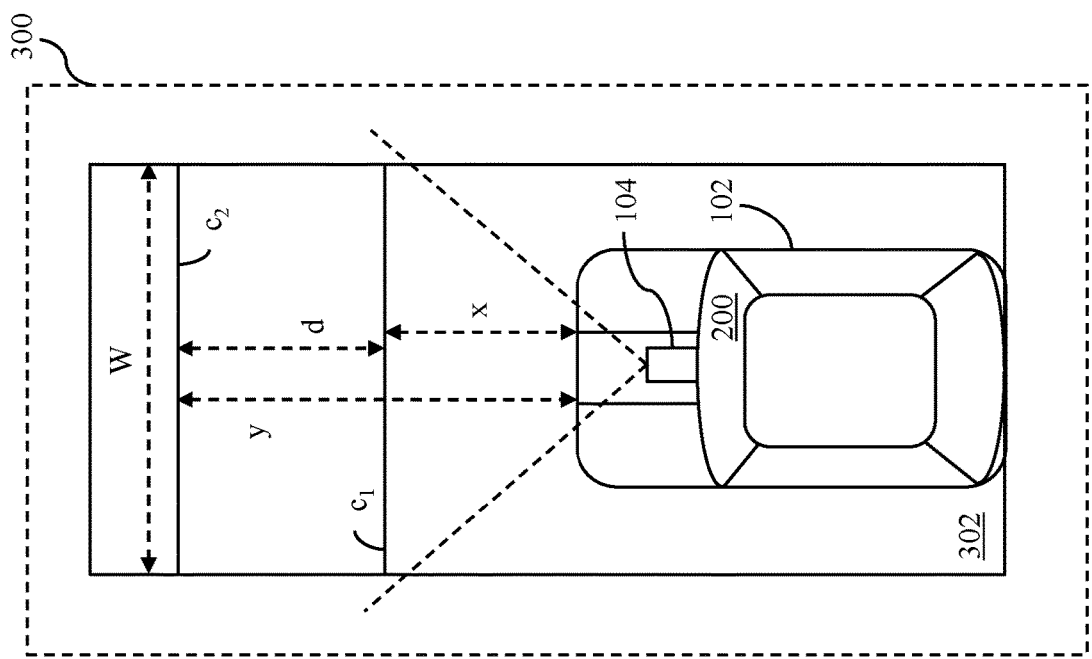
FIG. 3A illustrates a calibration system for calibrating an image-capturing device of the environment of FIG. 1, in accordance with an exemplary embodiment of the disclosure.

In an embodiment, in the calibration phase, the image-capturing device 106 may be configured to capture a first image (shown in FIGS. 3B and 4A) of a calibration system or environment (shown in FIG. 3A). In one example, the image-capturing device 106 may automatically capture the first image. In another example, the image-capturing device 106 may capture the first image of the calibration system based on an input triggered by an individual such as an administrator who is monitoring and managing the calibration phase.

In an embodiment, the calibration system or environment (hereinafter, "the calibration system") may include the vehicle 102, a carpet (shown in FIGS. 3A and 4A), and first and second calibration lines (shown in FIGS. 3A, 3B, and 4A) painted on the carpet. The first and second calibration lines may be perpendicular to a path of the vehicle 102. In another embodiment, the calibration system may include the vehicle 102 and third and fourth calibration lines (not shown) drawn on a ground plane (not shown) and the third and fourth calibration lines may be perpendicular to the path of the vehicle 102. In another embodiment, the calibration system may include the vehicle 102 and first and second colored tapes (not shown) pasted on the ground plane and the first and second colored tapes may be perpendicular to the path of the vehicle 102. In another embodiment, the calibration system may include the vehicle 102 and an enclosed space (not shown) with first and second rows of lights (not shown). The first and second rows of lights may be perpendicular to the path of the vehicle 102. The first and second calibration lines may be at a known distance from each other. Similarly, the third and fourth calibration lines may be at the known distance from each other. Further, the first and second colored tapes may be at the known distance from each other, and the first and second rows of lights may be at the known distance from each other. Further, the first and second calibration lines, the third and fourth calibration lines, the first and second colored tapes, and the first and second rows of lights may be associated with known widths.

For the sake of ongoing description, it is assumed that the calibration system includes the carpet laid in front of the vehicle 102 with the first and second calibration lines painted on the carpet. It is further assumed that the first and second calibration lines are having equal known widths (for example, 2 meters (m)) and are at the known distance from each other. It will be apparent to a person skilled in the art that the scope of the disclosure is not limited to the calibration system including only two calibration lines (such as the first and second calibration lines, the third and fourth calibration lines, the first and second colored tapes, or the first and second rows of lights). In various other embodiments, the calibration phase may be realized by using more than two calibration lines. Thus, the first image of the calibration system may include at least the carpet along with the first and second calibration lines painted on the carpet. Upon capturing of the first image of the calibration system, the image-capturing device 106 may be configured to transmit the first image (e.g., image data associated with the first image) to the processor 108, store the first image in the memory 110, transmit the first image to the application server 120, or transmit the first image to the database server 122.

In an embodiment, in the implementation phase, the image-capturing device 106 may be configured to capture a second image (shown in FIGS. 5A and 5B) of a road (or a route segment) along which the vehicle 102 is currently traversing. Upon capturing of the second image, the image-capturing device 106 may be configured to transmit the second image (e.g., image data associated with the second image) to the processor 108, store the second image in the memory 110, transmit the second image to the application server 120, or transmit the second image to the database server 122. The second image may include one or more objects (such as the first object) or a portion of the one or more objects that are present in a capturing range of the image-capturing device 106. In some embodiments, the second image may include various other objects apart from the first object. Examples of such objects include, but are not limited to, pedestrians, animals, other vehicles, road-dividers, non-drivable areas, rocks, road signs, buildings, and trees. For the sake of ongoing description, it is assumed that the distance prediction mechanism predicts the first distance of the first object from the vehicle 102. In some embodiments, the distance prediction mechanism may also predict distances of various other objects from the vehicle 102 in a manner similar to the prediction of the first distance of the first object from the vehicle 102.

The processor 108 may include suitable logic, circuitry, interfaces, and/or codes, executable by the circuitry, that may be configured to perform one or more operations. Examples of the processor 108 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor 108 may be compatible with multiple operating systems.

In an embodiment, the one or more operations may be associated with the calibration phase and the implementation phase. In an embodiment, in the calibration phase, the processor 108 may be configured to receive the first image from the image-capturing device 106. The processor 108 may be further configured to process the first image to identify first and second rows of pixels (shown in FIG. 3B) in the first image. The first and second rows of pixels (i.e., a first plurality of rows of pixels) may correspond to the first and second calibration lines painted on the carpet, respectively. The processor 108 may be further configured to estimate a second distance and a third distance of the first calibration line and the second calibration line, respectively, from the vehicle 102 (or the image-capturing device 106 of the vehicle 102). The processor 108 may estimate the second and third distances based on the known distance between the first and second calibration lines, a width of the first calibration line as observed in the first image (hereinafter, "a first observed width"), and a width of the second calibration line as observed in the first image (hereinafter, "a second observed width"). The processor 108 may be further configured to estimate a focal length of the image-capturing device 106 based on at least the first calibration line or the second calibration line. In an example, the processor 108 may estimate the focal length of the image-capturing device 106 based on the second distance of the first calibration line from the vehicle 102 (or the image-capturing device 106 of the vehicle 102), the known width (e.g., 2 m) of the first calibration line on the carpet, and the first observed width. In another example, the processor 108 may estimate the focal length of the image-capturing device 106 based on the third distance of the second calibration line from the vehicle 102 (or the image-capturing device 106 of the vehicle 102), the known width (e.g., 2 m) of the second calibration line on the carpet, and the second observed width. The known distance and the known widths are shown in FIG. 3A, and the first and second observed widths are shown in FIG. 3B.

In an embodiment, the processor 108 may be further configured to estimate a width of each line corresponding to each of remaining rows of pixels (i.e., a second plurality of rows of pixels) in the first image. For example, for each remaining row of pixels in the first image, the processor 108 may be configured to determine the width of a corresponding line based on a fourth distance between the corresponding row of pixels and the first or second row of pixels, the first and second observed widths, and a first angle. The first angle may be obtained by joining the same ends of the first and second calibration lines (as shown in FIG. 3B). The remaining rows of pixels in the first image may correspond to the second plurality of rows of pixels in the first image that does not include the first plurality of rows of pixels (i.e., the first and second rows of pixels). The processor 108 may be further configured to estimate a fifth distance of a line corresponding to each remaining row of pixels in the first image from the vehicle 102 (or the image-capturing device 106 of the vehicle 102) based on at least the estimated width of the corresponding line, the known width, and the focal length of the image-capturing device 106. Thus, each row of pixels in the first image may be associated with a corresponding distance from the vehicle 102 (or the image-capturing device 106 of the vehicle 102). In an embodiment, the processor 108 may be further configured to store the second and third distances of the first and second calibration lines along with the estimated fifth distances associated with the remaining rows of pixels in the memory 110. The second and third distances and the estimated fifth distances may be collectively referred to as, "a distance data set" that is obtained from the calibration phase. In another embodiment, the processor 108 may be further configured to store the distance data set in the database server 122.

In an embodiment, in the implementation phase, the processor 108 may be configured to receive the second image from the image-capturing device 106. The processor 108 may be further configured to process the second image to identify the one or more objects (such as the first object) captured in the second image. Further, the processor 108 may be configured to detect a first bottom edge of the first object. The processor 108 may be further configured to identify, in the second image, a third row of pixels associated with the first bottom edge. In an embodiment, based on the third row of pixels, the processor 108 may be further configured to retrieve a first distance value from the distance data set stored in the memory 110. In another embodiment, based on the third row of pixels, the processor 108 may be configured to transmit a query to the database server 122 to retrieve the first distance value from the distance data set stored in the database server 122. The first distance value may correspond to a fourth row of pixels in the first image having a row number that is equal to a row number of the third row of pixels in the second image. Thereafter, the processor 108 may be configured to predict the first distance of the first object from the vehicle 102 based on at least the retrieved first distance value. Based on the predicted first distance, the processor 108 may be configured to generate a warning message and communicate the warning message to a driver of the vehicle 102 to provide driving assistance in real-time. For example, if the first distance is less than a threshold value, the processor 108 may generate the warning message indicating an impending collision, for example, the generated warning message may read as "Hey driver! There is an obstacle at 5 m from your vehicle. The chances of the impending collision with the obstacle is high if you drive at the current speed. Go slow!!". Further, the processor 108 may communicate the warning message to the driver. The warning message may be communicated to the driver by communicating a short message service (SMS), an audio message, a video message, a haptic message, or the like.

The memory 110 may include suitable logic, circuitry, interfaces, and/or codes, executable by the circuitry, that may be configured to store one or more instructions that are executed by the image-capturing device 106 or the processor 108 to perform their operations. The memory 110 may be configured to store the first image, the second image, and the distance data set. Examples of the memory 110 may include, but are not limited to, a random-access memory (RAM), a read-only memory (ROM), a programmable ROM (PROM), and an erasable PROM (EPROM).

The image-capturing device 112 may include suitable logic, circuitry, interfaces, and/or code, executable by the circuitry, that may be configured to perform one or more operations. For example, the image-capturing device 112 may be an optical instrument that includes one or more image sensors for recording or capturing a set of images. The set of images may be individual still photographs or a sequence of images constituting a video. In an embodiment, the image-capturing device 112 may be installed on the front windshield of the vehicle 102 such that the image-capturing device 112 is positioned at a center of the front windshield and may be oriented to face outside the vehicle 102 for capturing the various objects (such as the first object) present in front of the vehicle 102. In another embodiment, the image-capturing device 112 may be installed behind the front windshield such that the image-capturing device 112 is positioned at a center of the front windshield and may be oriented to face outside the vehicle 102 for capturing the various objects present in front of the vehicle 102. In another embodiment, the image-capturing device 112 may be installed on the rear windshield of the vehicle 102 such that the image-capturing device 112 is positioned at a center of the rear windshield and may be oriented to face outside the vehicle 102 for capturing the various objects present behind the vehicle 102. The image-capturing device 112 may be connected to the vehicle device 114 via the communication network 124 or a second communication bus (not shown). Further, the image-capturing device 112 may be connected to the application server 120 via the communication network 124.

In an embodiment, in the calibration phase, the image-capturing device 112 may be configured to capture the first image of the calibration system and transmit the first image to the vehicle device 114 or the application server 120. In an embodiment, in the implementation phase, the image-capturing device 112 may be configured to capture the second image of the road (or the route segment) along which the vehicle 102 is currently traversing. Upon capturing of the second image, the image-capturing device 112 may be configured to transmit the second image to the processor 116, store the second image in the memory 118, transmit the second image to the application server 120, or transmit the second image to the database server 122. The second image may include the one or more objects (such as the first object) or a portion of the one or more objects that are present in a capturing range of the image-capturing device 112. The image-capturing device 112 may be structurally and functionally similar to the image-capturing device 106. However, the image-capturing device 106 is embedded within the vehicle device 104 whereas the image-capturing device 112 is a stand-alone device.

The vehicle device 114 may include suitable logic, circuitry, interfaces, and/or code, executable by the circuitry, that may be configured to perform one or more operations. The vehicle device 114 may be a computing device that is installed in the vehicle 102. Examples of the vehicle device 114 may include, but are not limited to, a mobile phone, a tablet, a laptop, a vehicle head unit, or any other portable communication device that is placed inside the vehicle 102. The vehicle device 114 may be realized through various web-based technologies such as, but not limited to, a Java web-framework, a .NET framework, a PHP framework, or any other web-application framework. The vehicle device 114 may be further realized through various embedded technologies such as, but are not limited to, microcontrollers or microprocessors that are operating on one or more operating systems such as Windows, Android, Unix, Ubuntu, Mac OS, or the like.

In an embodiment, the vehicle device 114 may be communicatively connected to the image-capturing device 112 for receiving one or more images (such as the first image and the second image) captured by the image-capturing device 112. The vehicle device 114 may be configured to execute various processes of the calibration and implementation phases by utilizing the processor 116 and the memory 118. In an embodiment, the processor 116 and the memory 118 may communicate with each other via a third communication bus (not shown).

The processor 116 may include suitable logic, circuitry, interfaces, and/or codes, executable by the circuitry, that may be configured to perform one or more operations. Examples of the processor 116 may include, but are not limited to, an ASIC processor, a RISC processor, a CISC processor, and an FPGA. It will be apparent to a person skilled in the art that the processor 116 may be compatible with multiple operating systems.

In an embodiment, the one or more operations may be associated with the calibration phase and the implementation phase. In an embodiment, in the calibration phase, the processor 116 may be configured to receive the first image from the image-capturing device 112. The processor 116 may be further configured to process the first image to identify the first and second rows of pixels in the first image. The first and second rows of pixels (i.e., the first plurality of rows of pixels) may correspond to the first and second calibration lines. The processor 116 may be further configured to estimate a second distance and a third distance of the first calibration line and the second calibration line, respectively, from the vehicle 102 (or the image-capturing device 106 of the vehicle 102). The processor 116 may estimate the second and third distances based on the known distance between the first and second calibration lines, the first observed width, and the second observed width. Based on at least the first calibration line or the second calibration line, the processor 116 may be further configured to estimate the focal length of the image-capturing device 112. In an example, the processor 116 may estimate the focal length of the image-capturing device 112 based on the second distance of the first calibration line from the vehicle 102 (or the image-capturing device 112 of the vehicle 102), the known width of the first calibration line on the carpet, and the first observed width. In another example, the processor 116 may estimate the focal length of the image-capturing device 112 based on the third distance of the second calibration line from the vehicle 102 (or the image-capturing device 112 of the vehicle 102), the known width of the second calibration line on the carpet, and the second observed width.

In an embodiment, the processor 116 may be further configured to estimate the width of each line corresponding to each of remaining rows of pixels (i.e., the second plurality of rows of pixels) in the first image. For example, for each remaining row of pixels in the first image, the processor 116 may determine the width of the corresponding line based on the fourth distance, the first and second observed widths, and the first angle. The processor 116 may be further configured to estimate the fifth distance of a line corresponding to each remaining row of pixels in the first image from the vehicle 102 (or the image-capturing device 112 of the vehicle 102) based on at least the estimated width of the corresponding line, the known width, and the focal length of the image-capturing device 112. Thus, each row of pixels in the first image may be associated with a corresponding distance from the vehicle 102 (or the image-capturing device 112 of the vehicle 102). In an embodiment, the processor 116 may be further configured to store the distance data set (i.e., the second and third distances and the estimated fifth distances) in the memory 118. In another embodiment, the processor 116 may be further configured to store the distance data set in the database server 122.

In an embodiment, in the implementation phase, the processor 116 may be configured to receive the second image from the image-capturing device 112. The processor 116 may be further configured to process the second image to identify the one or more objects (such as the first object) captured in the second image. Further, the processor 116 may be configured to detect the first bottom edge of the first object. The processor 116 may be further configured to identify, in the second image, the third row of pixels associated with the first bottom edge. In an embodiment, based on the third row of pixels, the processor 116 may be further configured to retrieve the first distance value from the distance data set stored in the memory 118. In another embodiment, based on the third row of pixels, the processor 116 may be further configured to transmit a query to the database server 122 to retrieve the first distance value from the distance data set stored in the database server 122. The first distance value may correspond to the fourth row of pixels in the first image having a row number that is equal to a row number of the third row of pixels in the second image. Thereafter, the processor 116 may be configured to predict the first distance of the first object from the vehicle 102 based on at least the retrieved first distance value. Based on the predicted first distance, the processor 116 may be configured to generate the warning message and communicate the warning message to the driver of the vehicle 102 to provide driving assistance in real-time. Additionally, the processor 116 may generate the warning message based on the predicted first distance and speed of the vehicle 102.

The memory 118 may include suitable logic, circuitry, interfaces, and/or codes, executable by the circuitry, that may be configured to store one or more instructions that are executed by the processor 116 to perform the one or more operations. The memory 118 may be configured to store the first image, the second image, and the distance data set. Examples of the memory 118 may include, but are not limited to, a RAM, a ROM, a PROM, and an EPROM.

The application server 120 may include suitable logic, circuitry, interfaces, and/or code, executable by the circuitry, that may be configured to perform one or more operations for device calibration and depth estimation. The application server 120 may be a computing device, which may include a software framework, that may be configured to create the application server implementation and perform the various operations associated with the device calibration and depth estimation. The application server 120 may be realized through various web-based technologies, such as, but not limited to, a Java web-framework, a .NET framework, a PHP framework, a python framework, or any other web-application framework. Examples of the application server 120 may include, but are not limited to, a personal computer, a laptop, or a network of computer systems. The application server 120 may be communicatively connected to the vehicle device 104 or the image-capturing device 112 and vehicle device 114 via the communication network 124.

In an exemplary embodiment, the application server 120 may be configured to receive the first image from the image-capturing device 112. The application server 120 may be further configured to process the first image to identify the first and second rows of pixels in the first image corresponding to the first and second calibration lines, respectively. The application server 120 may be further configured to estimate the second distance and the third distance of the first calibration line and the second calibration line, respectively, from the vehicle 102 (or the image-capturing device 112 of the vehicle 102). The application server 120 may estimate the second and third distances based on the known distance between the first and second calibration lines, the first observed width, and the second observed width. Based on at least the first calibration line or the second calibration line, the application server 120 may be further configured to estimate the focal length of the image-capturing device 112. The application server 120 may be further configured to estimate, for each remaining row of pixels in the first image, the width of the corresponding line based on the fourth distance, the first and second observed widths, and the first angle. The application server 120 may be further configured to estimate the fifth distance of a line corresponding to each remaining row of pixels from the vehicle 102 (or the image-capturing device 112 of the vehicle 102) based on the estimated width of the corresponding line, the known width, and the focal length. Thus, each row of pixels in the first image may be associated with a corresponding distance from the vehicle 102 (or the image-capturing device 112 of the vehicle 102). In an embodiment, the application server 120 may be further configured to store the distance data set (i.e., the second and third distances and the estimated fifth distances) in the database server 122.

In an embodiment, in the implementation phase, the application server 120 may be configured to receive the second image from the image-capturing device 112. The application server 120 may be further configured to process the second image to identify the one or more objects (such as the first object) captured in the second image. Further, the application server 120 may be configured to detect the first bottom edge of the first object and identify the third row of pixels associated with the first bottom edge in the second image. Based on the third row of pixels, the application server 120 may be further configured to transmit a query to the database server 122 to retrieve the first distance value from the distance data set stored in the database server 122. The first distance value may correspond to the fourth row of pixels in the first image having a row number that is equal to a row number of the third row of pixels in the second image. Thereafter, the application server 120 may be configured to predict the first distance of the first object from the vehicle 102 based on at least the retrieved first distance value. Based on the predicted first distance, the application server 120 may be further configured to generate the warning message and communicate the warning message to the driver of the vehicle 102 to provide driving assistance in real-time.

The database server 122 may include suitable logic, circuitry, interfaces, and/or code, executable by the circuitry, that may be configured to perform one or more operations, such as receiving, storing, processing, and transmitting queries, data, or content. The database server 122 may be a data management and storage computing device that is communicatively coupled to the vehicle device 104, the image-capturing device 112, the vehicle device 114, and the application server 120 via the communication network 124 to perform the one or more operations. In an exemplary embodiment, the database server 122 may be configured to manage and store one or more images (such as the first image) captured by the image-capturing device 106 or 112. The database server 122 may be further configured to manage and store one or more images (such as the second image) captured by the image-capturing device 106 or 112. The database server 122 may be further configured to manage and store the distance data set. The database server 122 may be further configured to manage and store one or more warning messages corresponding to one or more first distances of the one or more objects from the vehicle 102.

In an embodiment, the database server 122 may be configured to receive one or more queries from the processor 108, the processor 116, or the application server 120 via the communication network 124. Each query may correspond to an encrypted message that is decoded by the database server 122 to determine a request for retrieving requisite information. In response to each received query, the database server 122 may be configured to retrieve and communicate the requested information to the processor 108, the processor 116, or the application server 120 via the communication network 124. Examples of the database server 122 include, but are not limited to, a personal computer, a laptop, or a network of computer systems.

The communication network 124 may include suitable logic, circuitry, interfaces, and/or code, executable by the circuitry, that may be configured to transmit queries, data, content, messages, and requests between various entities, such as the vehicle device 104, the image-capturing device 112, the vehicle device 114, the application server 120, and/or the database server 122. Examples of the communication network 124 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may connect to the communication network 124 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Although the present disclosure describes the calibration and implementation phases being executed in association with the same vehicle (e.g., the vehicle 102), it will be apparent to a person skilled in the art that the scope of the disclosure is not limited to the same vehicle for executing the calibration and implementation phases. In various other embodiments, the calibration and implementation phases may be executed for two separate vehicles (such as a first vehicle and a second vehicle). In such a scenario, to ensure accuracy of the distance prediction, a position of an image-capturing device (such as the image-capturing device 106 or the image-capturing device 112) on the first vehicle in the calibration phase is the same as a position of another image-capturing device on the second vehicle in the implementation phase. Further, specification of the image-capturing devices used with the first vehicle and the second vehicle may be the same. Further, various dimensions of the first vehicle and the second vehicle may be similar. Various operations associated with the calibration of fixed image-capturing devices of vehicles for depth estimation have been described in detail in conjunction with FIGS. 2A, 2B, 3A, and 3B.

Figure 2A:
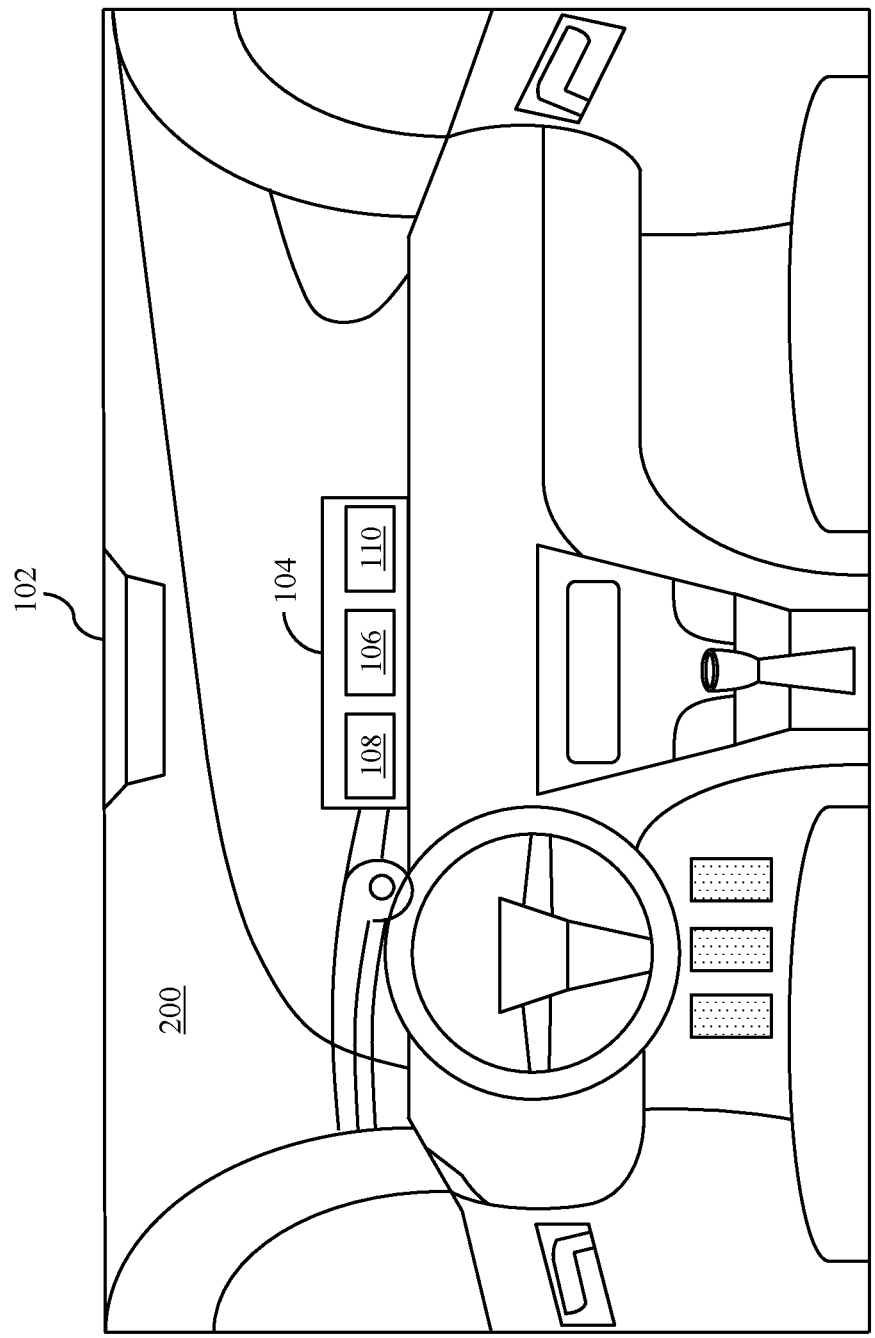
FIG. 2A illustrates an inside view of a vehicle of the environment of FIG. 1, in accordance with an exemplary embodiment of the disclosure.

FIG. 2A illustrates an inside view of the vehicle 102, in accordance with an exemplary embodiment of the disclosure. The vehicle 102 may include the vehicle device 104 that is installed on a front windshield 200 of the vehicle 102. The vehicle device 104 may include the image-capturing device 106, the processor 108, and the memory 110 that are communicatively connected to each other via the first communication bus. Also, the vehicle device 104 may be communicatively connected to the application server 120 via the communication network 124. In an embodiment, the image-capturing device 106 is positioned perpendicular to the ground plane to ensure that sizes and distances of the various objects (such as the first object) captured by the image-capturing device 106 are not distorted.

It will be apparent to a person skilled in the art that the scope of the disclosure is not limited to the installation of the vehicle device 104 as shown in FIG. 2A. In various other embodiments, the position of the vehicle device 104 in the vehicle 102 may vary. However, the position of the image-capturing device 106 in the vehicle 102 may remain intact with respect to the calibration phase and the implementation phase. For example, if the position of the image-capturing device 106 installed with the vehicle 102 is defined by $x_1$, $y_1$, and $z_1$ coordinates in the calibration phase, then the position of the image-capturing device 106 installed with the vehicle 102 may be defined by the same $x_1$, $y_1$, and $z_1$ coordinates in the implementation phase. The $x_1$, $y_1$, and $z_1$ coordinates may be defined with respect to a fixed point on the vehicle 102.

Figure 2B:
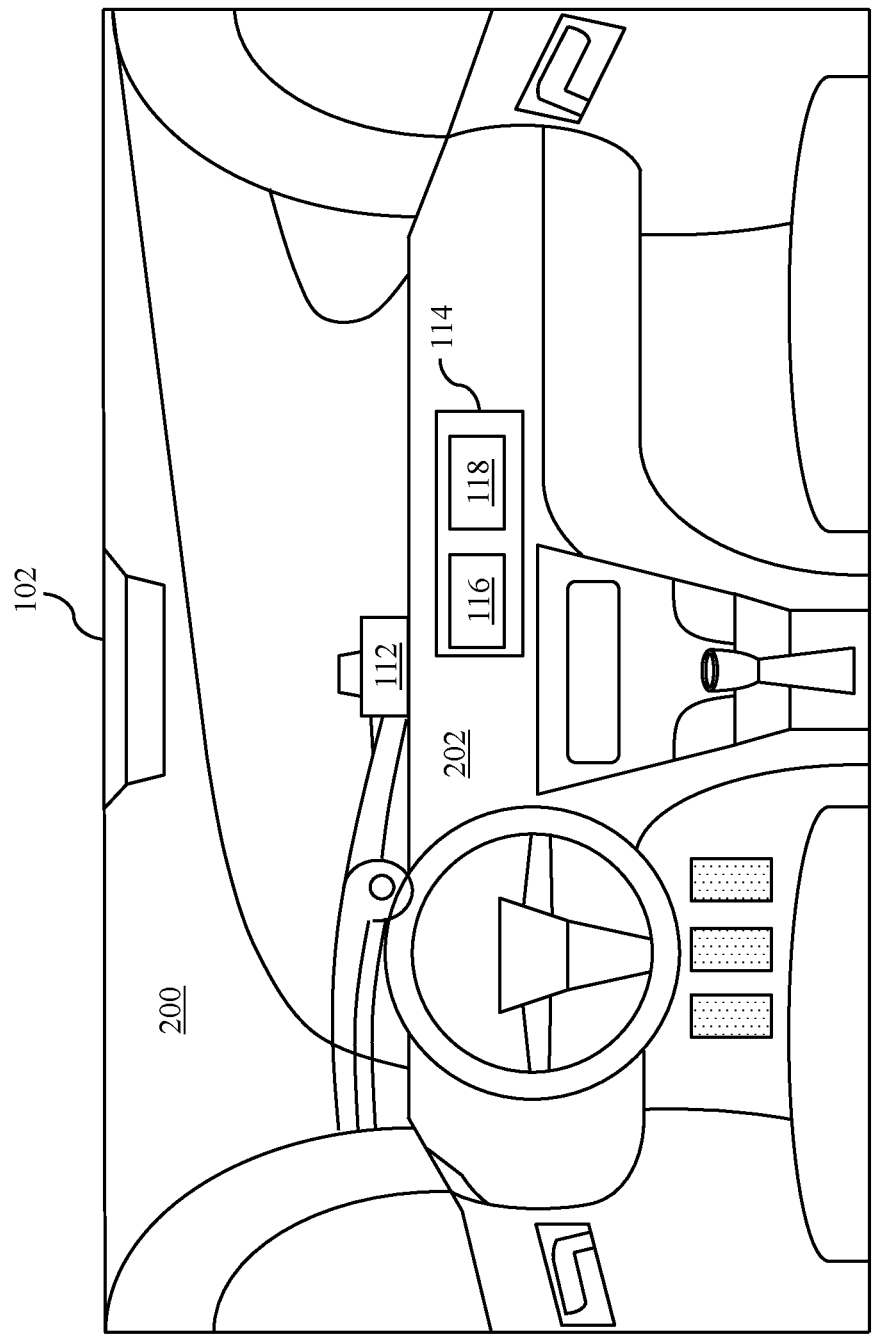
FIG. 2B illustrates an inside view of the vehicle, in accordance with another exemplary embodiment of the disclosure.

FIG. 2B illustrates an inside view of the vehicle 102, in accordance with another exemplary embodiment of the disclosure. The vehicle 102 may include the image-capturing device 112 that is installed on the front windshield 200 of the vehicle 102. The vehicle 102 may further include the vehicle device 114 that is installed on a dashboard 202 of the vehicle 102. The vehicle device 114 may include the processor 116 and the memory 118 that are communicatively connected to each other via the third communication bus. The image-capturing device 112 may be communicatively connected to the vehicle device 114 via the communication network 124 or the second communication bus. Also, the image-capturing device 112 and the vehicle device 114 may be communicatively connected to the application server 120 via the communication network 124. In an embodiment, the image-capturing device 112 is positioned perpendicular to the ground plane to ensure that sizes and distances of the various objects captured by the image-capturing device 112 are not distorted.

It will be apparent to a person skilled in the art that the scope of the disclosure is not limited to the installation of the image-capturing device 112 and the vehicle device 114 as shown in FIG. 2B. In various other embodiments, the positions of the image-capturing device 112 and the vehicle device 114 in the vehicle 102 may vary. However, the position of the image-capturing device 112 in the vehicle 102 may remain intact with respect to the calibration phase and the implementation phase. For example, if the position of the image-capturing device 112 installed with the vehicle 102 is defined by $x_2$, $y_2$, and $z_2$ coordinates in the calibration phase, then the position of the image-capturing device 112 installed with the vehicle 102 may be defined by the same $x_2$, $y_2$, and $z_2$ coordinates in the implementation phase. The $x_2$, $y_2$, and $z_2$ coordinates may be defined with respect to a fixed point on the vehicle 102.

FIG. 3A illustrates the calibration system 300 for calibrating the image-capturing device 106 of the vehicle 102, in accordance with an exemplary embodiment of the disclosure. The calibration system 300 may include the vehicle 102 and the carpet 302 having the first and second calibration lines $c_1$ and $c_2$. The first and second calibration lines $c_1$ and $c_2$ may be associated with the same known width W and may be at the known distance d from each other. In an embodiment, the second distance of the first calibration line $c_1$ from the vehicle 102 is illustrated in the FIG. 3A as "x" (hereafter referred to as, "the second distance x"). Further, the third distance of the second calibration line $c_2$ from the vehicle 102 is illustrated in the FIG. 3B as "y" (hereafter referred to as, "the third distance y"), where y=d+x. Further, the first and second calibration lines $c_1$ and $c_2$ may be parallel to each other and perpendicular to the path of the vehicle 102. In an embodiment, the vehicle device 104 may be installed on the front windshield 200 of the vehicle 102 such that the image-capturing device 106 may be at the center of the front windshield 200. In another embodiment, the image-capturing device 112 may be installed at the center of the front windshield 200 for capturing the first image of the calibration system 300. For the sake of ongoing description, it is assumed that the vehicle device 104 is installed on the front windshield 200. Further, the vehicle 102 is moving on the carpet 302, and the image-capturing device 106 may be configured to capture the first image of the calibration system 300.

FIG. 3B illustrates the first image 304 captured by the image-capturing device 106, in accordance with an exemplary embodiment of the disclosure. The first image 304 may include the first and second calibration lines $c_1$ and $c_2$. In an exemplary embodiment, one or more points on the carpet 302 (that lie at a distance from the vehicle 102) may be observed at the same distance (i.e., height) in the first image 304. In other words, the one or more points associated with the first calibration line $c_1$ painted on the carpet 302 at the second distance x from the vehicle 102 may be observed in the first image 304 along the same row of pixels (i.e., the first row of pixels $r_1$). Similarly, the one or more points associated with the second calibration line $c_2$ painted on the carpet 302 at the third distance y from the vehicle 102 may be observed in the first image 304 along the same row of pixels (i.e., the second row of pixels $r_2$). Thus, the first and second rows of pixels $r_1$ and $r_2$ may be at the second and third distances x and y from the vehicle 102, respectively.

As illustrated in FIG. 3A, the second distance x is less than the third distance y. Hence, the first observed width $w_1$ (i.e., the width of the first calibration line $c_1$ as observed in the first image 304) is greater than the second observed width $w_2$ (i.e., the width of the second calibration line $c_2$ as observed in the first image 304) even though the first and second calibration lines $c_1$ and $c_2$ may have the same width (i.e., the known width W) on the carpet 302. The difference in the first and second observed widths $w_1$ and $w_2$ may be represented by $\delta_w$. Further, when the first and second calibration lines $c_1$ and $c_2$ are centered with respect to an axis passing through the center of the image-capturing device 106, the difference in the first and second observed widths $w_1$ and $w_2$ may be symmetric on both sides of the axis (illustrated as $\delta_w/2$ in the first image 304 of FIG. 3B).

It will be apparent to a person having ordinary skill in the art that vertical edges of the carpet 302 (that are straight lines in the calibration system 300) may be observed as tilted lines in the first image 304 due to perspective distortion. In other words, the carpet 302 with a rectangular shape may be observed as a trapezoid in the first image 304. The distance between the first and second rows of pixels (illustrated by h in the first image 304) may correspond to the height of the trapezoid. An angle $\theta$ may be the first angle between the first calibration line $c_1$ and a first line joining the end points of the first and second calibration lines $c_1$ and $c_2$, as shown in FIG. 3B. Similarly, an angle $\alpha$ may be a second angle between the first calibration line $c_1$ and a second line joining the end points of the first and second calibration lines $c_1$ and $c_2$. The first and second lines may correspond to two non-parallel sides of the trapezoid and the angles $\theta$ and $\alpha$ may correspond to base angles of the trapezoid. When the first and second calibration lines $c_1$ and $c_2$ are centered with respect to the axis of the image-capturing device 106, lengths of the first and second lines may be equal and the angle $\theta$ may be equal to the angle $\alpha$. In other words, the carpet 302 may be observed as an isosceles trapezoid in the first image 304.

In operation, the distance prediction mechanism associated with the vehicle 102 may be calibrated in the calibration phase to predict the first distance of the first object captured in front of the vehicle 102 in the implementation phase. For the sake of ongoing description, it is assumed that the distance prediction mechanism may be realized and implemented by utilizing the vehicle device 104 that is installed with the vehicle 102. The vehicle device 104 may include the image-capturing device 106, the processor 108, and the memory 110. However, it will be apparent to a person skilled in the art that the scope of the disclosure is not limited to the realization and implementation of the distance prediction mechanism by utilizing the vehicle device 104. In various other embodiments, the distance prediction mechanism may be realized and implemented by utilizing the image-capturing device 112 and the vehicle device 114, the image-capturing device 112, the application server 120, and the database server 122, or any combination thereof.

In the calibration phase, the vehicle device 104 may be calibrated by utilizing the calibration system 300. The calibration system 300 may include the first and second calibration lines $c_1$ and $c_2$ on the carpet 302 such that the first and second calibration lines $c_1$ and $c_2$ may have the same width (i.e., the known width W) that is equal to a width of the carpet 302. Further, the first calibration line $c_1$ may be drawn at the known distance d from the second calibration line $c_2$. The first and second calibration lines $c_1$ and $c_2$ may be parallel to each other and perpendicular to the path of the vehicle 102. In an embodiment, during execution of calibration processes of the calibration phase, the vehicle 102 is traversing along the carpet 302, and the image-capturing device 106 may be configured to capture the first image 304 of the calibration system 300. The first image 304 illustrates the first and second calibration lines $c_1$ and $c_2$ having the first and second observed widths $w_1$ and $w_2$, respectively. Upon capturing the first image 304, the image-capturing device 106 may be configured to transmit the first image 304 to the processor 108. In an embodiment, a color model associated with the first image 304 is the RGB color model.

In an embodiment, the processor 108 may be configured to receive the first image 304 from the image-capturing device 106 and process the first image 304 to identify the first plurality of rows of pixels (such as the first and second rows of pixels $r_1$ and $r_2$) in the first image 304. The first and second rows of pixels $r_1$ and $r_2$ may correspond to the first and second calibration lines $c_1$ and $c_2$, respectively. In an embodiment, the processor 108 may be configured to identify the first and second rows of pixels $r_1$ and $r_2$ based on one or more inputs provided by the administrator utilizing one or more input/output ports (not shown) of the vehicle device 104. In another embodiment, the processor 108 may be configured to convert the first image 304 from the RGB color model to another color model such as the HSV color model. Thereafter, the processor 108 may be further configured to filter the converted first image (not shown) to obtain a known color of the carpet 302, and further process the filtered first image (shown in FIGS. 4B and 4C) to identify the first and second rows of pixels $r_1$ and $r_2$. In another embodiment, the first and second rows of pixels $r_1$ and $r_2$ may also be identified by utilizing a crowdsourcing platform where other users (e.g., crowd workers) may take up the related tasks, identify the first and second rows of pixels $r_1$ and $r_2$, and upload the identified first and second rows of pixels $r_1$ and $r_2$ onto the crowdsourcing platform in an online manner. The afore-mentioned method for identifying the first and second rows of pixels $r_1$ and $r_2$ has been described in detail in conjunction with FIGS. 4A-4C.

Further, in an embodiment, the processor 108 may be configured to estimate the focal length of the image-capturing device 106 based on one of the first calibration line $c_1$ or the second calibration line $c_2$. Further, it is apparent to a person skilled in the art that the focal length F may be estimated by utilizing a first equation (1) as shown below:

$$F = \frac{w_k * d_k}{W} \quad (1)$$

Further, the first equation (1) may be modified to a second equation (2) as shown below:

$$F*W = w_k*d_k \quad (2)$$

In the estimation of the focal length F based on the first calibration line $c_1$, $w_k$ indicates the first observed width $w_1$, $d_k$ indicates the second distance x, and W indicates the known width of the first calibration line $c_1$. Thus, the second equation (2) may be modified to a third equation (3) as shown below:

$$F*W = w_1*x \quad (3)$$

Similarly, in the estimation of the focal length F based on the second calibration line $c_2$, $w_k$ indicates the second observed width $w_2$, $d_k$ indicates the third distance y, and W indicates the known width of the second calibration line $c_2$. Thus, the second equation (2) may be modified to a fourth equation (4) as shown below:

$$F*W = w_2*y \quad (4)$$

As the first and second calibration lines $c_1$ and $c_2$ may be associated with equal known widths W and the focal length F may be a constant value for the image-capturing device 106, the left-hand sides (LHSs) of the third equation (3) and the fourth equation (4) are equal. Hence, based on the third equation (3) and the fourth equation (4), a fifth equation (5) may be obtained that is shown below:

$$w_1*x = w_2*y \quad (5)$$

where, $y = d+x$

Further, the fifth equation (5) may be modified to obtain a sixth equation (6) as shown below:

$$x = \frac{d*w_2}{(w_1 - w_2)} \quad (6)$$

Thus, the processor 108 may be configured to estimate the second distance x based on the known distance d, the first observed width $w_1$, and the second observed $w_2$. Similarly, the processor 108 may be configured to estimate the third distance y based on the second distance x and the known distance d. Further, in an embodiment, the processor 108 may be configured to estimate the focal length of the image-capturing device 106 based on the first equation (1).

Further, as illustrated in FIG. 3B, the first observed width $w_1$ may be greater than the second observed width $w_2$ since the second distance x is less than third distance y. The difference between the first and second observed widths $w_1$ and $w_2$ may be represented by $\delta_w$. Since the first and second calibration lines $c_1$ and $c_2$ are centered with respect to the axis of the image-capturing device 106, the difference $\delta_w$ may be symmetric. Thus, $\delta_w/2$ may be estimated by utilizing a seventh equation (7) as shown below:

$$\frac{\delta_w}{2} = h*\cot\theta \quad (7)$$

where,
h indicates the second distance between the first and second rows of pixels ($r_2 - r_1$), and θ indicates the angle of the isosceles trapezoid.

Thus, the difference $\delta_w$ may be estimated by utilizing an eighth equation (8) as shown below:

$$\delta_2 = 2*h*\cot\theta \quad (8)$$

In an embodiment, for one or more rows of pixels above the first row of pixels $r_1$, a width of a corresponding line may be reduced. Thus, for a third line (not shown) corresponding to a fifth row of pixels $r_5$ that is between the first and second rows of pixels $r_1$ and $r_2$ in the first image 304, a width of the third line may be less than the first observed width $w_1$ and more than the second observed width $w_2$. Hence, the width of the third line (hereinafter, "the third width") may be estimated based on a change in width $\delta_w'$ of the third line with respect to either the first calibration line $c_1$ or the second calibration line $c_2$. For example, the third width $w_3$ of the third line with respect to the first calibration line $c_1$ may be estimated by utilizing a ninth equation (9) as shown below:

$$w_3 = w_1 - \delta_w' \quad (9)$$

where, $\delta_w' = 2*(r_5 - r_1)*\cot \theta$.

Similarly, a width of a line corresponding to an "$i^{th}$" row of pixels $r_i$ above the first row of pixels $r_1$ may be estimated by utilizing a tenth equation (10) as shown below:

$$w_i = w_1 - 2*(r_i - r_1)*\cot \theta \quad (10)$$

where, $(r_i - r_1)$ indicates the second distance between the "$i^{th}$" row of pixels $r_i$ and the first row of pixels $r_1$.

In an embodiment, for one or more rows of pixels below the first row of pixels, a width of a corresponding line may be increased. Hence, a width of a line corresponding to a "$j^{th}$" row of pixels $r_j$ below the first row of pixels $r_1$ may be estimated by utilizing an eleventh equation (11) as shown below:

$$w_j = w_1 + 2*(r_1 - r_j)*\cot \theta \quad (11)$$

where, $(r_1 - r_j)$ indicates the second distance between the first row of pixels $r_1$ and the "$j^{th}$" row of pixels $r_j$.

Similarly, for one or more rows of pixels below the second row of pixels $r_2$, a width of a corresponding line may be increased. Hence, the third width $w_3$ with respect to the second calibration line $c_2$ may be estimated by utilizing a twelfth equation (12) as shown below:

$$w_3 = w_2 + \delta_w' \quad (12)$$

Similarly, a width of a line corresponding to a "$p^{th}$" row of pixels $r_p$ below the second row of pixels $r_2$ may be estimated by utilizing a thirteenth equation (13) as shown below:

$$w_p = w_2 + 2*(r_2 - r_p)*\cot \theta \quad (13)$$

where, $(r_2 - r_p)$ indicates the second distance between the second row of pixels $r_2$ and the "$p^{th}$" row of pixels $r_p$.

Further, for one or more rows of pixels above the second row of pixels $r_2$, a width of a corresponding line may be reduced. Hence, a width of a line corresponding to a "$q^{th}$" row of pixels $r_q$ above the second row of pixels $r_2$ may be estimated by utilizing a fourteenth equation (14) as shown below:

$$w_q = w_2 - 2*(r_q - r_2)*\cot \theta \quad (14)$$

where, $(r_q - r_2)$ indicates the second distance between the "$q^{th}$" row of pixels $r_q$ and the second row of pixels $r_2$.

Thus, for each of the remaining rows of pixels (i.e., the second plurality of rows of pixels) in the first image 304, the processor 108 may be configured to estimate the width of the corresponding line. In an embodiment, the processor 108 may be further configured to estimate the fifth distance of a line corresponding to each remaining row of pixels from the vehicle 102 based on the corresponding estimated width, the known width W, and the focal length F. For example, the fifth distance ds of a line corresponding to an "$s^{th}$" row of pixels $r_s$ of the remaining rows of pixels from the vehicle 102 may be estimated by utilizing a fifteenth equation (15) as shown below:

$$d_s = \frac{W * F}{w_s} \quad (15)$$

where, $w_s$ indicates the estimated width of a line corresponding to the "$s^{th}$" row of pixels $r_s$.

In an embodiment, based on the estimated distances, the processor 108 may be configured to store the second and third distances x and y associated with the first and second rows of pixels $r_1$ and $r_2$, respectively, and the fifth distance associated with each remaining row of pixels as the distance data set in the memory 110. In another embodiment, the processor 108 may be configured to store the distance data set in the database server 122. The vehicle device 104 may utilize the distance data set to predict the first distance of the first object in the implementation phase i.e., in the real-time driving scenarios.

In the implementation phase, when the vehicle 102 is traversing the road, the image-capturing device 106 may be configured to continuously capture the one or more images of the various objects that are present in front of the vehicle 102. For example, the image-capturing device 106 may capture the second image of the first object on the road and transmit the second image to the processor 108.

The processor 108 may be configured to receive the second image from the image-capturing device 106 and process the second image to detect the first object in the second image. The processor 108 may be further configured to detect the first bottom edge of the first object in the second image. In an embodiment, the processor 108 may perform an object detection operation on the second image to detect the first object in the second image. Examples of the object detection may include a Haar based object detection, a histogram of oriented gradients (HOG) based object detection, an HOG and support vector machines (SVM), i.e., the HOG-SVM based object detection, deep learning based object detection (using a convolutional neural network (CNN) approach, a region-of-interest-CNN i.e., an R-CNN approach, a fast R-CNN approach, or a faster R-CNN approach), or any combination thereof. The object detection operation may output a first rectangular bounding-box (shown in FIGS. 5A and 5B) that may include the first object in the second image. The first bottom edge of the first rectangular bounding-box may indicate a line of contact of the first object with the ground plane i.e., the first bottom edge of the first rectangular bounding-box may lie on the ground plane, as viewed from the image-capturing device 106.

Upon detection of the first bottom edge, the processor 108 may be configured to identify the third row of pixels in the second image associated with the first bottom edge. In an embodiment, based on the third row of pixels, the processor 108 may be configured to retrieve the first distance value from the memory 110. In another embodiment, based on the third row of pixels, the processor 108 may transmit the query to the database server 122 to retrieve the first distance value. The first distance value may correspond to the fourth row of pixels in the first image 304 having the row number that is equal to the row number of the third row of pixels in the second image. Further, the processor 108 may predict the first distance of the first object from the vehicle 102 based on the first distance value. In an embodiment, the first distance may be a distance of the first object from the image-capturing device 106. A distance of the first object from a front edge of the vehicle 102 may be determined based on at least the first distance and a length of bonnet of the vehicle 102.

Further, the processor 108 may be configured to generate the warning message based on the first distance of the first object and communicate the warning message to the driver of the vehicle 102. For example, if the first distance is less than the threshold value, the processor 108 may generate the warning message indicating the impending collision of the vehicle 102 with the first object, and communicate the warning message to the driver for offering the driving assistance in real-time that may help to prevent the impending collision. In some embodiments, the processor 108 may generate the warning message based on the first distance and speed of the vehicle 102. The processor 108 may communicate the warning message to the driver by communicating an SMS, an audio message, a video message, a haptic message, or the like.

In some embodiments, other than the first object, the first image may include various other objects. Distances of the various other objects captured in the second image may be predicted by executing a process that is similar to the process for predicting the first distance of the first object from the vehicle 102. Further, although the disclosure describes use of a single image-capturing device (e.g., the image-capturing device 106) it will be apparent to a person skilled in the art that the scope of the disclosure is not limited to the use of the single image-capturing device. In some embodiments, a plurality of image-capturing devices having same or different focal lengths may be utilized.

Although the disclosure describes the prediction of distances of the various objects in front of the vehicle 102, it will be apparent to a person skilled in the art that the scope of the disclosure is not limited to the prediction of distances of the various objects that are in the front of the vehicle 102. In some embodiments, distances of various objects (that are behind or sideways to the vehicle 102) may also be predicted in the similar manner as described above. For predicting the distances of the various objects (that are behind the vehicle 102), a rear image-capturing device (not shown) may be installed on a rear side of the vehicle 102. Similarly, for predicting the distances of the various objects (that are sideways to the vehicle 102), one or more sideway image-capturing devices (not shown) may be installed on each side of the vehicle 102.

Figure 4A:
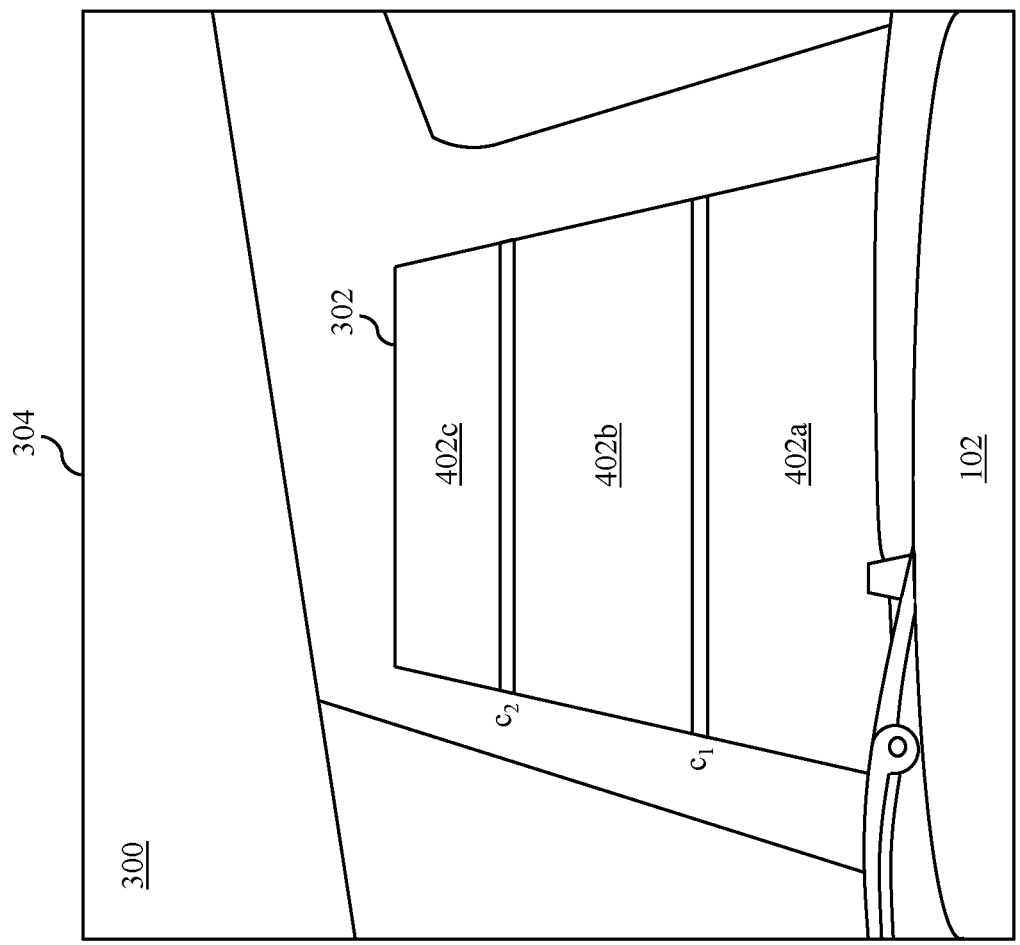
FIGS. 4A-4C, collectively, illustrate identification of first and second rows of pixels in the first image of FIG. 3B corresponding to first and second calibration lines of FIG. 3A, respectively, in accordance with an exemplary embodiment of the disclosure.
Figure 4B:
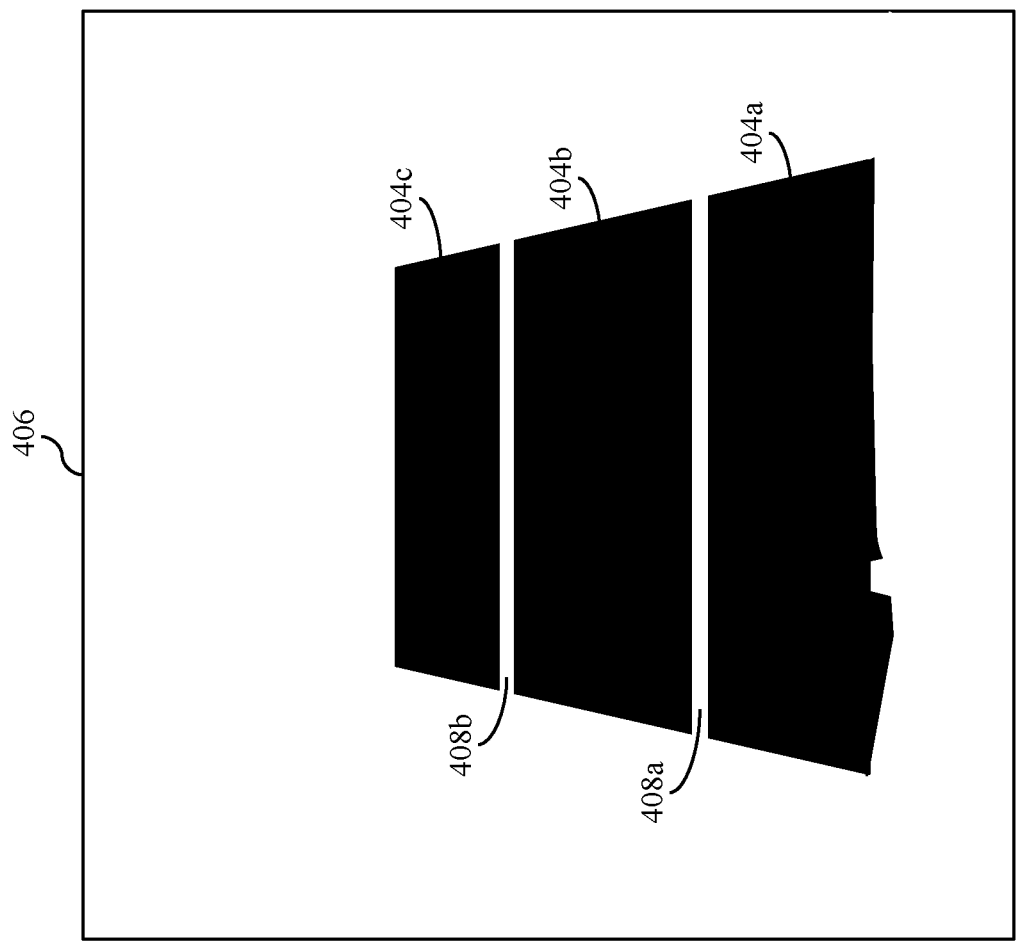
Figure 4C:
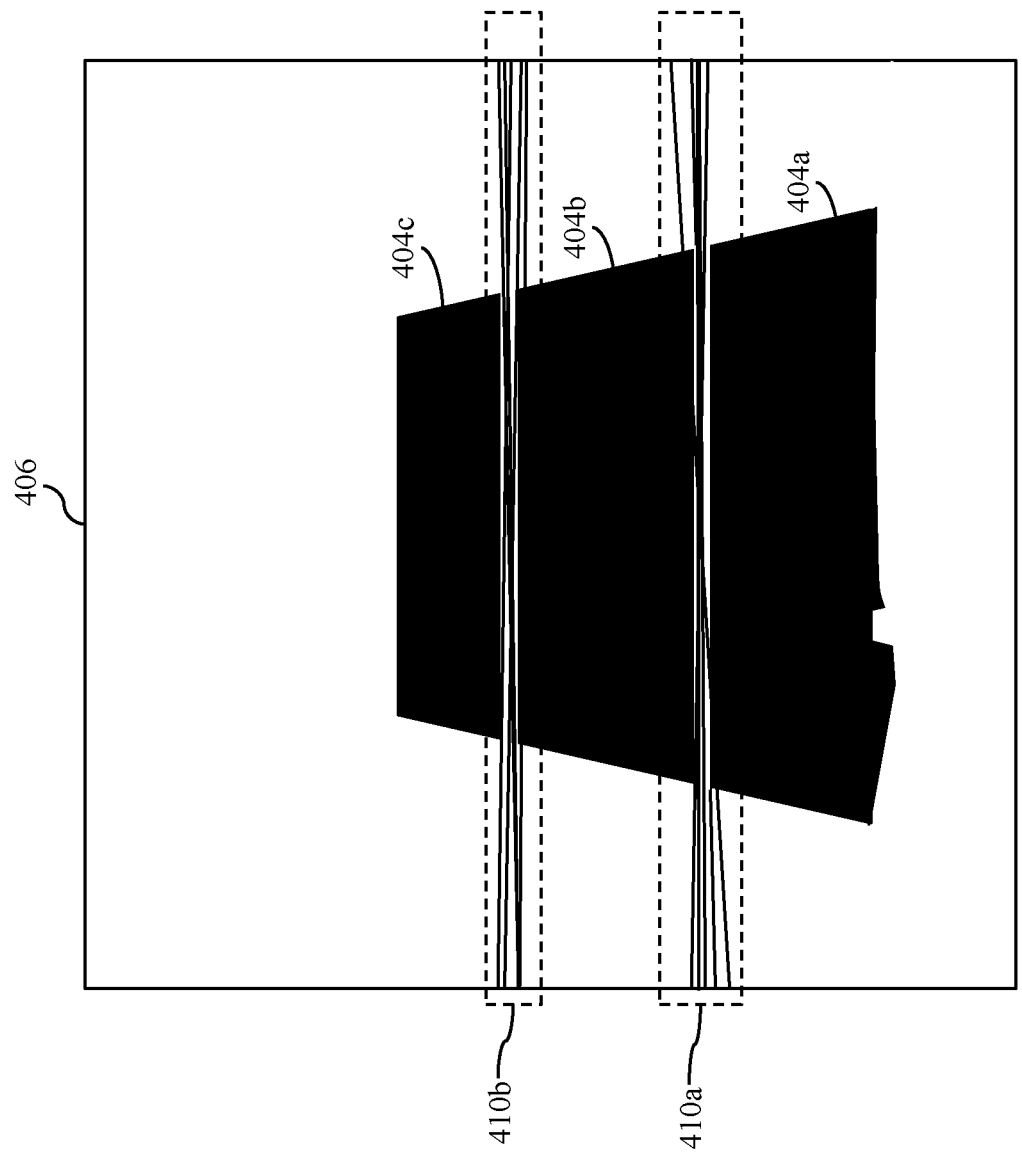

FIGS. 4A-4C, collectively, illustrate identification of the first and second rows of pixels $r_1$ and $r_2$ corresponding to the first and second calibration lines $c_1$ and $c_2$, respectively, in accordance with an exemplary embodiment of the disclosure. As illustrated in FIG. 4A, the image-capturing device 106 installed on the front windshield 200 may be configured to capture the first image 304 of the calibration system 300. The image-capturing device 106 may be further configured to transmit the first image 304 to the processor 108. The first image 304 may include the carpet 302 and the first and second calibration lines $c_1$ and $c_2$ drawn on the carpet 302. The first and second calibration lines $c_1$ and $c_2$ may be at the second distance x and the third distance y, respectively, from the vehicle 102. As illustrated in FIG. 4A, the first and second calibration lines $c_1$ and $c_2$ may divide the carpet 302 into a plurality of sections such as sections 402a-402c. For simplicity of the ongoing discussion, a color of the carpet 302 used in the calibration system has been assumed as green color.

Further, the color model associated with the first image 304 may be the RGB color model. However, the separation of color (i.e., separation of the green color of the carpet 302 from other colors in the first image 304) may be more distinct in the HSV color model as compared to the RGB color model. Thus, the processor 108 may be configured to convert the first image 304 from the RGB color model into the HSV color model. The processor 108 may be further configured to filter the converted first image to distinctly obtain the green color sections (i.e., the sections 402a-402c) in the converted first image. The sections 402a-402c of green color in the first image 304 have been illustrated as sections 404a-404c of black color in the filtered first image 406 (as illustrated in FIG. 4B). Further, the filtered first image 406 may include a section 408a (between the sections 404a and 404b) and a section 408b (between the sections 404b and 404c). The sections 408a and 408b may be indicative of the first and second calibration lines $c_1$ and $c_2$, respectively.

The processor 108 may be further configured to perform an edge detection operation on the filtered first image 406 to identify a set of lines 410a passing through the section 408a and a set of lines 410b passing through the section 408b. The sets of lines 410a and 410b are illustrated in FIG. 4C. The sets of lines 410a and 410b may be candidate lines for the first and second calibration lines $c_1$ and $c_2$, respectively. The processor 108 may be further configured to perform a Hough transform operation on the filtered first image 406 to identify first and second reference lines from the sets of lines 410a and 410b that correspond to the first and second calibration lines $c_1$ and $c_2$, respectively. In an example, the first and second reference lines may be identified from the sets of lines 410a and 410b, respectively, based on a slope of each line. The processor 108 may identify the first and second rows of pixels $r_1$ and $r_2$ based on the first and second reference lines, respectively. In an example, the processor 108 may identify the first and second rows of pixels $r_1$ and $r_2$ based on coordinates of the first and second reference lines, respectively.

Figure 5A:
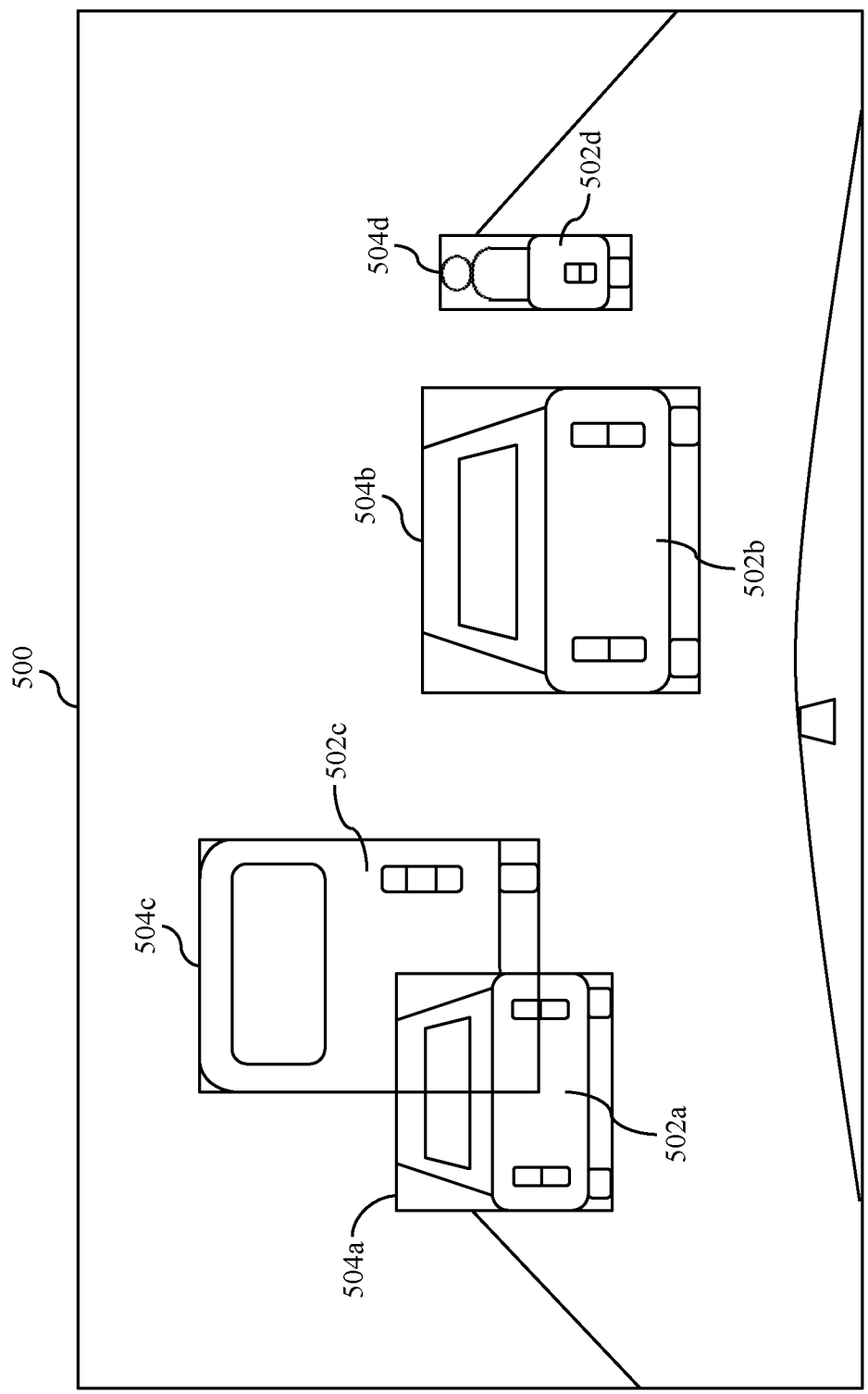
FIG. 5A illustrates a second image including objects captured by the image-capturing device, in accordance with an exemplary embodiment of the disclosure.

FIG. 5A illustrates the second image 500 including objects captured by the image-capturing device 106, in accordance with an exemplary embodiment of the disclosure. The second image 500 may include objects 502a-502d present on the road in front of the vehicle 102. For example, the objects 502a and 502b are cars, the object 502c is a truck, and the object 504d is a bike. In an embodiment, the object 502a is the first object. In another embodiment, the object 502b is the first object. In another embodiment, the object 502c is the first object. In another embodiment, the object 502d is the first object. The second image 500 may further include rectangular bounding-boxes 504a-504d around the borders of the objects 502a-502d indicating likely positions of the objects 502a-502d in the second image 500, respectively. The rectangular bounding-boxes 504a-504d may be obtained as a result of the object detection operation performed by the processor 108 on the second image 500. Examples of the object detection may include a Haar based object detection, a histogram of oriented gradients (HOG) based object detection, an HOG and support vector machines (SVM) i.e., the HOG-SVM based object detection, deep learning based object detection (using a convolutional neural network (CNN) approach, a region-of-interest-CNN, i.e., an R-CNN approach, a fast R-CNN approach, or a faster R-CNN approach), or any combination thereof.

Figure 5B:
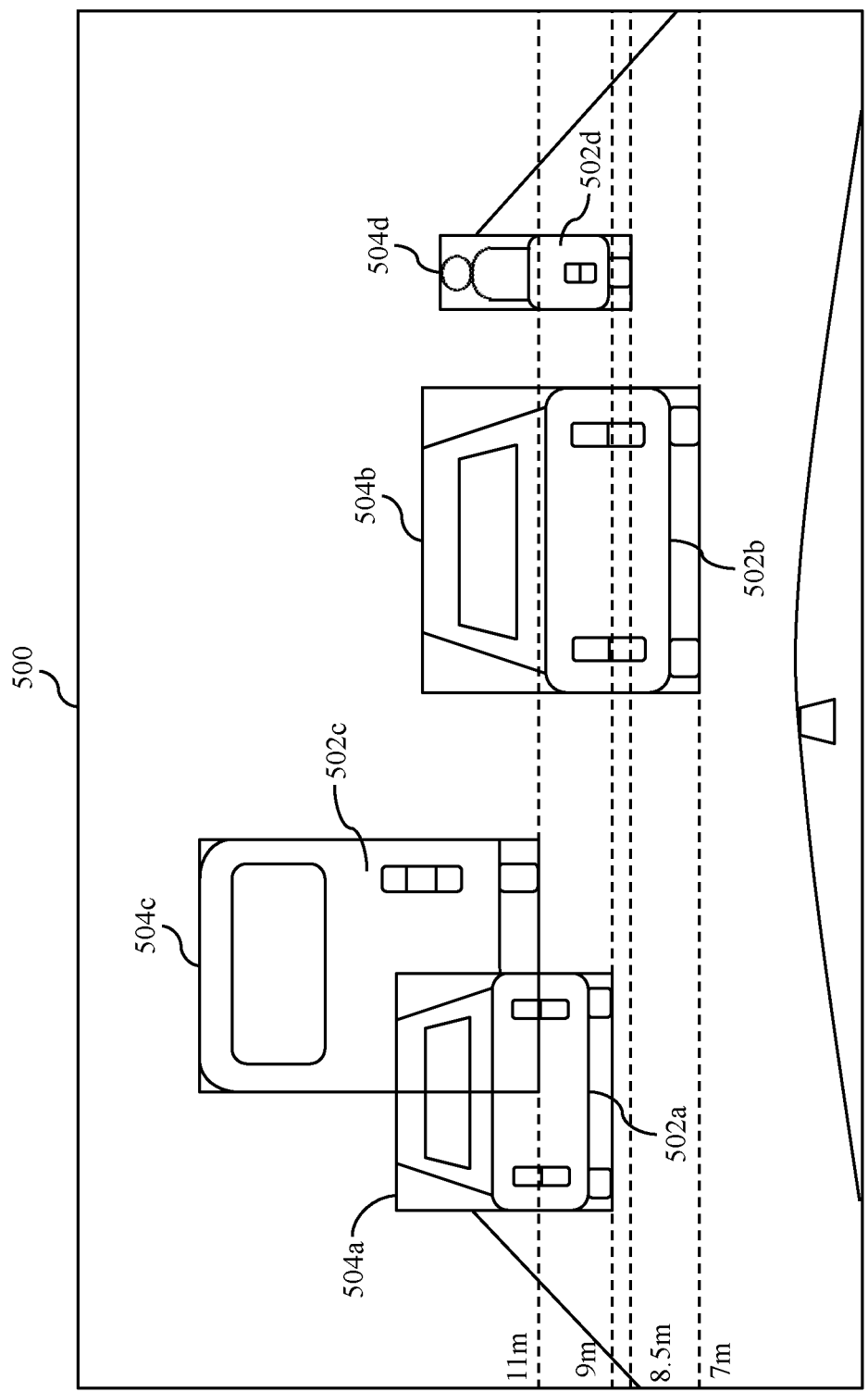
FIG. 5B illustrates predicted distances of the objects from the vehicle, in accordance with an exemplary embodiment of the disclosure.

FIG. 5B illustrates the predicted distances of the objects 502a-504d from the vehicle 102, in accordance with an exemplary embodiment of the disclosure. As illustrated in FIG. 5B, the object 502a is at a distance of 9 m from the vehicle 102, the object 502b is at a distance of 7 m from the vehicle 102, the object 502c is at a distance of 11 m from the vehicle 102, and the object 502d is at a distance of 8.5 m from the vehicle 102. The predicted distance (i.e., the first distance) of each object in front of the vehicle 102 may be presented to the driver of the vehicle 102. Further, based on at least the predicted distance of each object, the warning message may be generated and communicated to the driver. For example, if the predicted distances of any of the objects 502a-502d (such as the object 502a) is less than the threshold value, then a time to collision of the vehicle 102 with the object 502a may be determined. The time to collision may be determined based on the predicted distance and a relative speed between the vehicle 102 and the object 502a. Based on the determined time to collision, the warning message indicating the impending collision may be generated and communicated to the driver of the vehicle 102. The warning message may be communicated in the form of a text message, an audio signal, a video signal, or the like. In an embodiment, the predicted distance of each object may indicate a distance between the bottom edge of the corresponding object and the front end of the vehicle 102. In another embodiment, the predicted distance of each object may indicate a distance between the bottom edge of the corresponding object and the image-capturing device 106 of the vehicle device 104 installed in the vehicle 102.

Figure 6A:
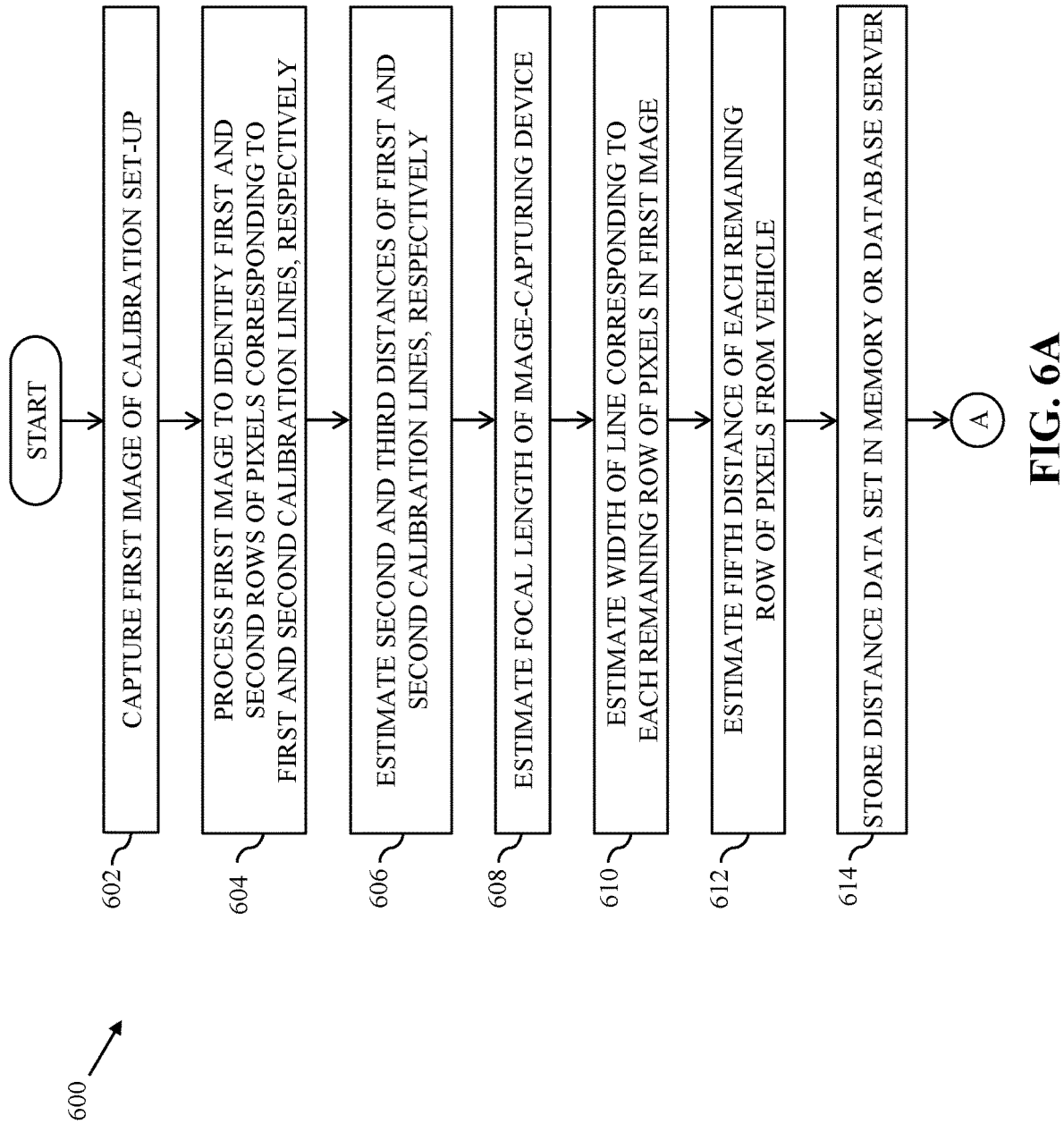

FIGS. 6A and 6B illustrate a flow chart 600 of a method for predicting the first distance of the first object from the vehicle 102, in accordance with an exemplary embodiment of the disclosure. The distance prediction mechanism may detect a presence of the first object in front of the moving vehicle (e.g., the vehicle 102) and may predict the distance of the first object from the moving vehicle. In an embodiment, the distance prediction mechanism may be the vehicle device 104 that includes the image-capturing device 106, the processor 108, and the memory 110. The vehicle device 104 may be calibrated in the calibration phase to predict the first distance in the implementation phase. The vehicle device 104 may be calibrated by way of the calibration system 300 that may include the first and second calibration lines $c_1$ and $c_2$ drawn on the carpet 302 at the known distance d from each other.

At 602, the first image 304 of the calibration system is captured. In an embodiment, the image-capturing device 106 may be configured to capture the first image 304. The first image 304 may include the first and second calibration lines $c_1$ and $c_2$. The image-capturing device 106 may be configured to transmit the first image 304 (i.e., image data associated with the first image 304) to the processor 108.

At 604, the first and second rows of pixels $r_1$ and $r_2$ corresponding to the first and second calibration lines $c_1$ and $c_2$, respectively, are identified in the first image 304. In an embodiment, the processor 108 may be configured to identify the first and second rows of pixels $r_1$ and $r_2$ based on the first image 304.

At 606, the second distance x and the third distance y of the first and second calibration lines $c_1$ and $c_2$, respectively, from the vehicle 102 is estimated. In an embodiment, the processor 108 may be configured to estimate the second distance x and the third distance y of the first and second calibration lines $c_1$ and $c_2$, respectively, from the vehicle 102 based on the known distance d, the first observed width $w_1$, and the second observed width $w_2$.

At 608, the focal length F of the image-capturing device 106 is estimated. In an embodiment, the processor 108 may be configured to estimate the focal length F of the image-capturing device 106 based on at least the first calibration line $c_1$ or the second calibration $c_2$. For example, the processor 108 may estimate the focal length F of the image-capturing device 106 based on the second distance x and the known width W of the first calibration line $c_1$, and the first observed width $w_1$.

At 610, the width of the line corresponding to each remaining row of pixels in the first image 304 is estimated. In an embodiment, the processor 108 may be configured to estimate, for each remaining row of pixels in the first image 304, the width of the corresponding line based on the fourth distance between the corresponding row of pixels and the first or the second row of pixels $r_1$ or $r_2$, the first and second observed widths $w_1$ and $w_2$, and the first angle θ. The remaining rows of pixels in the first image 304 may correspond to the rows of pixels in the first image 304 apart from the first and second rows of pixels $r_1$ and $r_2$.

At 612, the fifth distance of a line corresponding to each remaining row of pixels in the first image 304 from the vehicle 102 is estimated. In an embodiment, the processor 108 may be configured to estimate the fifth distance of a line corresponding to each remaining row of pixels in the first image 304 from the vehicle 102 based on the known width W, the estimated width of the corresponding line, and the focal length F. Thus, each row of pixels in the first image 304 may have a corresponding distance from the vehicle 102 associated with it.

At 614, the distance data set is stored in the memory 110 or the database server 122. In an embodiment, the processor 108 may be configured to store the distance data set in the memory 110 or the database server 122. The distance data set may include the second and third distances x and y associated with the first and second rows of pixels in the first image 304 and the estimated distance associated with each remaining row of pixels in the first image 304. Thus, the vehicle device 104 may be calibrated to predict distances of the various objects based on distance values included in the distance data set that may be stored in the memory 110 or the database server 122.

The implementation phase of the disclosure may correspond to the vehicle 102 traversing the road. At 616, the second image 500 of the first object (e.g., the objects 502a-502d) present on the road in front of the vehicle 102 is captured. In an embodiment, the image-capturing device 106 may be configured to capture the second image 500, as the vehicle 102 traverses the road, and transmit the second image 500 (i.e., image data associated with the second image 500) to the processor 108. The second image 500 includes the first object (e.g., the objects 502a-502d).

At 618, the first bottom edge of the first object is detected in the second image 500. In an embodiment, the processor 108 may be configured to detect the first bottom edge of the first object based on the second image 500. At 620, the third row of pixels in the second image 500 corresponding to the first bottom edge is identified. In an embodiment, the processor 108 may be configured to identify the third row of pixels in the second image 500 corresponding to the first bottom edge. At 622, the first distance value from the memory 110 or the database server 122 is retrieved. In an embodiment, the processor 108 may be configured to retrieve the first distance value from the memory 110 based on the third row of pixels. In another embodiment, based on the third row of pixels, the processor 108 may be configured to transmit the query to the database server 122 to retrieve the first distance value. The first distance value may correspond to the fourth row of pixels in the first image 304 whose row number is equal to the row number of the third row of pixels in the second image 500.

At 624, the first distance of the first object from the vehicle 102 is predicted. In an embodiment, the processor 108 may be configured to predict the first distance of the first object from the vehicle 102 based on the retrieved first distance value. At 626, the warning message is generated. In an embodiment, the processor 108 may be configured to generate the warning message based on the predicted first distance. For example, the processor 108 may generate the warning message when the first distance is less than the threshold value. At 628, the warning message is communicated to the driver of the vehicle 102. In an embodiment, the processor 108 may be configured to communicate the warning message to the driver of the vehicle 102 indicating the impending collision.

Figure 6C:
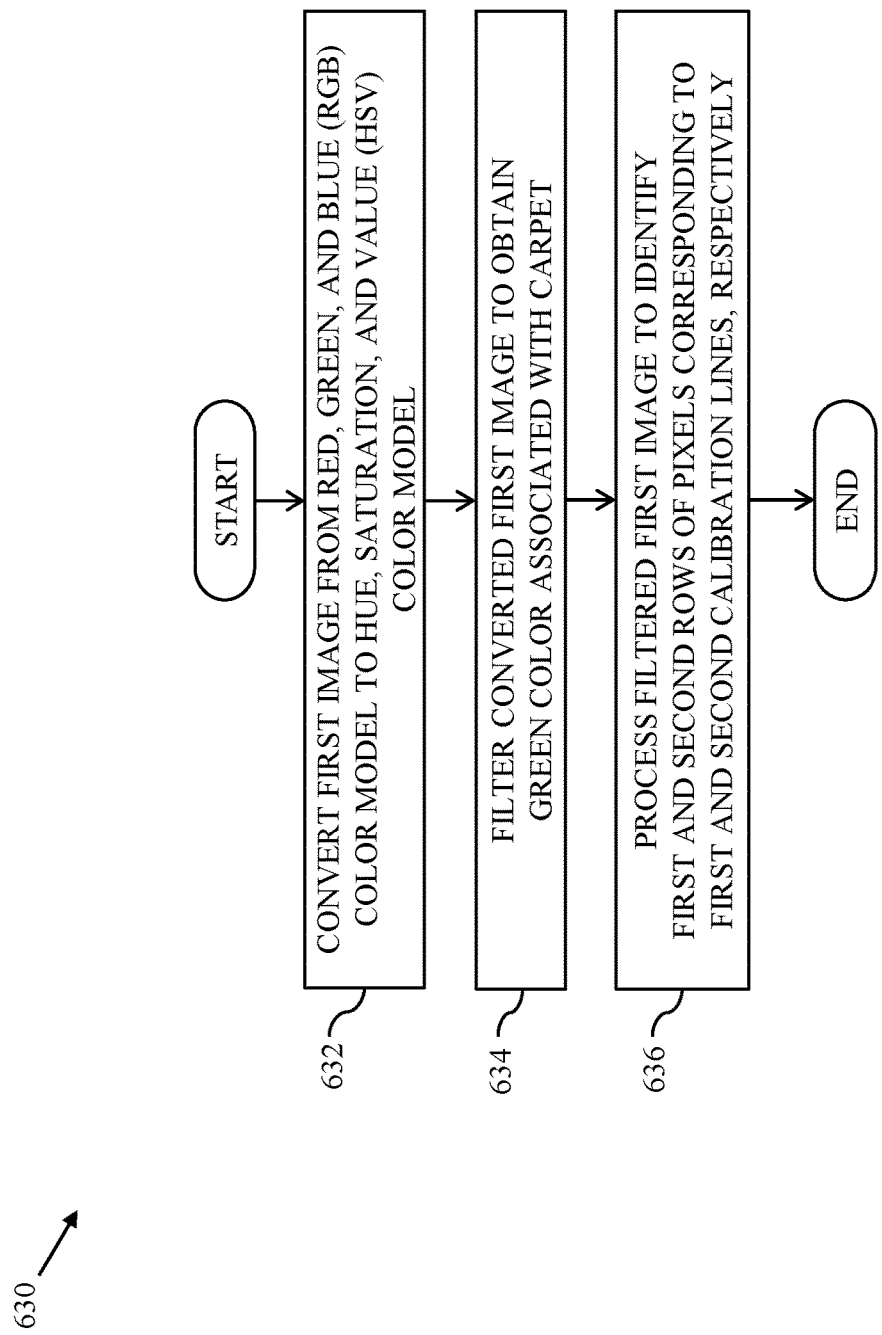
FIG. 6C illustrates a flowchart of a method for identifying the first and second rows of pixels corresponding to the first and second calibration lines, respectively, in accordance with an exemplary embodiment of the disclosure.

FIG. 6C illustrates a flowchart 630 of a method for identifying the first and second rows of pixels $r_1$ and $r_2$ corresponding to the first and second calibration lines $c_1$ and $c_2$, respectively, in accordance with an exemplary embodiment of the disclosure. The processor 108 may be configured to receive the first image 304 of the calibration system 300 including the first and second calibration lines $c_1$ and $c_2$ from the image-capturing device 106. The color model associated with the first image 304 is the RGB color model. However, the separation of color (e.g., the green color of the carpet 302) is more distinct in the HSV color model as compared to the RGB color model.

At 632, the first image 304 is converted from the RGB color model to the HSV color model. In an embodiment, the processor 108 may be configured to convert the first image 304 from the RGB color model to the HSV color model. At 634, the converted first image is filtered to obtain the green color associated with the carpet 302. In an embodiment, the processor 108 may be configured to filter the converted first image to obtain the green color associated with the carpet 302 of the calibration system 300. At 636, the first and second rows of pixels $r_1$ and $r_2$ corresponding to the first and second calibration lines $c_1$ and $c_2$, respectively, are identified from the filtered first image 406. In an embodiment, the processor 108 may be configured to identify the first and second rows of pixels $r_1$ and $r_2$ corresponding to the first and second calibration lines $c_1$ and $c_2$, respectively, from the filtered first image 406.

Figure 7:
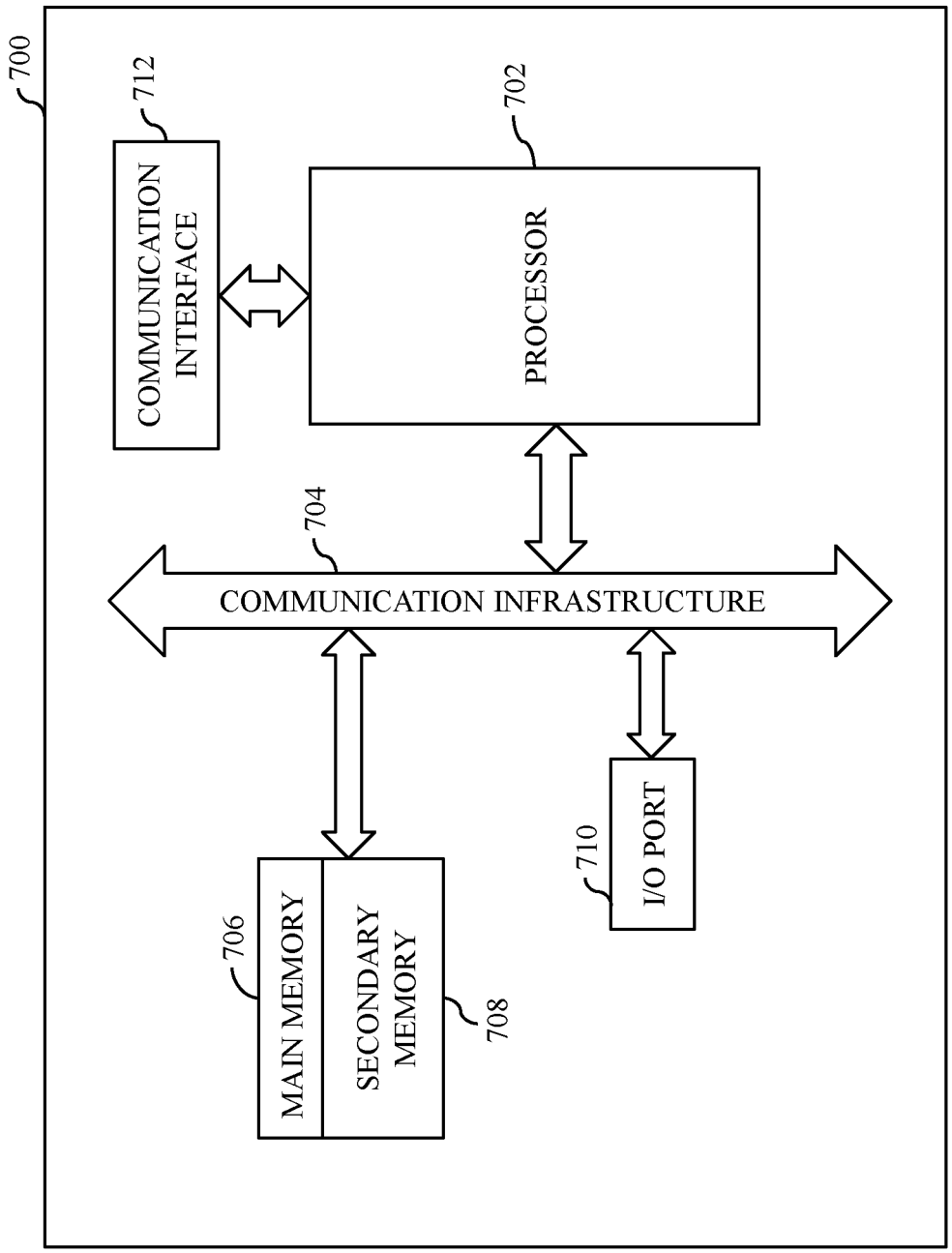
FIG. 7 is a block diagram that illustrates a computer system for calibrating a fixed image-capturing device of a vehicle and predicting a distance of an object from the vehicle, in accordance with an exemplary embodiment of the disclosure.

FIG. 7 is a block diagram that illustrates a computer system 700 for calibrating a fixed image-capturing device (such as the image-capturing device 106 or 112) of a vehicle (such as the vehicle 102) and predicting a distance of an object (such as the first object) from the vehicle, in accordance with an exemplary embodiment of the disclosure. An embodiment of the disclosure, or portions thereof, may be implemented as computer readable code on the computer system 700. In one example, the vehicle device 104, the vehicle device 114, the application server 120, and the database server 122 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6A-6C.

The computer system 700 may include a processor 702 that may be a special purpose or a general-purpose processing device. The processor 702 may be a single processor, multiple processors, or combinations thereof. The processor 702 may have one or more processor "cores." Further, the processor 702 may be connected to a communication infrastructure 704, such as a bus, a bridge, a message queue, multi-core message-passing scheme, the communication network 124, or the like. The computer system 700 may further include a main memory 706 and a secondary memory 708. Examples of the main memory 706 may include RAM, ROM, and the like. The secondary memory 708 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 700 may further include an input/output (I/O) port 710 and a communication interface 712. The I/O port 710 may include various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communication port, and the like. Data transferred via the communication interface 712 may be signals, such as electronic, electromagnetic, optical, or other signals as will be apparent to a person skilled in the art. The signals may travel via a communications channel, such as the communication network 124, which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The main memory 706 and the secondary memory 708 may refer to non-transitory computer readable mediums that may provide data that enables the computer system 700 to implement the methods illustrated in FIGS. 6A-6C.

Various embodiments of the disclosure provide the vehicle device 104 for calibrating the fixed image-capturing device (such as the image-capturing device 106) of the vehicle 102. The vehicle device 104 may be configured to identify the first plurality of rows of pixels (such as the first and second rows of pixels $r_1$ and $r_2$) in the first image 304. The first image 304 may be captured by the image-capturing device 106. The first image 304 may include the plurality of calibration lines (such as the first and second calibration lines $c_1$ and $c_2$). The first calibration line $c_1$ of the plurality of lines is at the known distance d from the second calibration line $c_2$ of the plurality of lines. The first plurality of rows of pixels may correspond to the plurality of calibration lines. The vehicle device 104 may be further configured to estimate the second distance x and the third distance y of the first and second calibration lines $c_1$ and $c_2$, respectively, from the image-capturing device 106. The second distance x and the third distance y are estimated based on at least the known distance d, the first observed width $w_1$, and the second observed width $w_2$. The vehicle device 104 may be further configured to estimate the focal length F of the image-capturing device 106. The focal length F may be estimated based on at least the first calibration line $c_1$ or the second calibration line $c_2$. The vehicle device 104 may be further configured to estimate the fifth distance of each row of pixels of the second plurality of rows of pixels in the first image 304 from the image-capturing device 106. The fifth distance may be estimated based on at least the focal length F and the width (such as the third width $w_3$) of the line (such as the third line) corresponding to each row of pixels. The third width $w_3$ may be estimated based on at least the plurality of calibration lines and each row of pixels of the second plurality of rows of pixels. The first plurality of rows of pixels and the second plurality of rows of pixels may constitute the first image. The vehicle device 104 may be further configured to store the distance data set including at least the second distance x, the third distance y, and the fifth distance in a memory (such as the memory 110). Further, a distance of an object from another object may be predicted based on the stored distance data set and an image of the object.

Various embodiments of the disclosure provide the vehicle device 104 for predicting the first distance of the first object from the vehicle 102. In an embodiment, the image-capturing device 106 of the vehicle device 104 may be configured to capture the image (such as the second image 500) of the first object. The processor 108 of the vehicle device 104 may be configured to detect the first bottom edge of the first object based on the second image. The processor 108 may be further configured to identify the row of pixels (such as the third row of pixels) in the second image 500 corresponding to the detected bottom edge. The processor 108 may be further configured to predict the first distance of the first object from the vehicle 102 based on a distance value retrieved from the distance data set that may be stored in the memory 110 of the vehicle device 104 or a separate memory device installed in the vehicle 102. The distance value may be retrieved from the distance data set based on at least the third row of pixels. The distance data set may be estimated by executing one or more calibration operations. For example, the plurality of rows of pixels (such as first plurality of rows of pixels) in the image (such as the first image 304) including the plurality of calibration lines may be identified. The first plurality of rows of pixels may correspond to the plurality of calibration lines. The first calibration line $c_1$ of the plurality of calibration lines is the known distance d from the second calibration line $c_2$ of the plurality of calibration lines. Further, the second distance x and the third distance y of the first and second calibration lines $c_1$ and $c_2$, respectively, from a second object of the calibration system 300 may be estimated. The second distance x and the third distance y are estimated based on at least the known distance d, the first observed width $w_1$, and the second observed width $w_2$.

Further, the distance data set for the plurality of rows of pixels (such as the second plurality of rows of pixels) in the first image 304 may be estimated based on at least the width (such as the third width $w_3$) of the line (such as the third line) corresponding to each of the second plurality of rows of pixels and one of the first calibration line $c_1$ or the second calibration line $c_2$. The third width $w_3$ may be estimated based on at least the plurality of calibration lines and each row of pixels of the second plurality of rows of pixels. The distance data set may further include at least the second distance x and the third distance y. The first image 304 may comprise the first plurality of rows of pixels and the second plurality of rows of pixels. The retrieved distance value may be associated with the fourth row of pixels in the first image 304 having a row number that is equal to a row number of the third row of pixels in the second image 500. Upon prediction of the first distance of the first object from the vehicle 102, the processor 108 may be configured to generate the warning message based on at least the predicted distance. The processor 108 may be further configured to communicate the warning message to the driver of the vehicle 102 indicating the impending collision.

Various embodiments of the disclosure provide a non-transitory computer readable medium having stored thereon, computer executable instructions, which when executed by a computer, cause the computer to execute operations for calibrating the fixed image-capturing device (such as the image-capturing device 106) of the vehicle 102. The operations include identifying, by the vehicle device 104, the first plurality of rows of pixels (such as the first and second rows of pixels $r_1$ and $r_2$) in the first image 304. The first image 304 may be captured by the image-capturing device 106. The first image 304 may include the plurality of calibration lines (such as the first and second calibration lines $c_1$ and $c_2$). The first calibration line $c_1$ of the plurality of lines is at the known distance d from the second calibration line $c_2$ of the plurality of lines. The first plurality of rows of pixels may correspond to the plurality of calibration lines. The operations further include estimating, by the vehicle device 104, the second distance x and the third distance y of the first and second calibration lines $c_1$ and $c_2$, respectively, from the image-capturing device 106. The second distance x and the third distance y are estimated based on at least the known distance d, the first observed width $w_1$, and the second observed width $w_2$. The operations further include estimating, by the vehicle device 104, the focal length F of the image-capturing device 106. The focal length F may be estimated based on at least the first calibration line $c_1$ or the second calibration line $c_2$. The operations further include estimating, by the vehicle device 104, the fifth distance of each row of pixels of the second plurality of rows of pixels in the first image 304 from the image-capturing device 106. The fifth distance may be estimated based on at least the focal length F and the width (such as the third width $w_3$) of the line (such as the third line) corresponding to each row of pixels. The third width $w_3$ may be estimated based on at least the plurality of calibration lines and each row of pixels of the second plurality of rows of pixels. The first plurality of rows of pixels and the second plurality of rows of pixels may constitute the first image. The operations further include storing, by the vehicle device 104, the distance data set including at least the second distance x, the third distance y, and the fifth distance in the memory (such as the memory 110). Further, a distance of an object from another object may be predicted based on the stored distance data set and an image of the object.

Various embodiments of the disclosure provide a non-transitory computer readable medium having stored thereon, computer executable instructions, which when executed by a computer, cause the computer to execute operations for predicting the first distance of the first object from the vehicle 102. The operations include capturing, by the image-capturing device 106 of the vehicle device 104, the image (such as the second image 500) of the first object. The operations further include detecting, by the processor 108 of the vehicle device 104, the first bottom edge of the first object based on the second image 500. The operations further include identifying, by the processor 108, the row of pixels (such as the third row of pixels) in the second image 500 corresponding to the detected bottom edge. The operations further include predicting, by the processor 108, the first distance of the first object from the vehicle 102 based on a distance value retrieved from the distance data set that may be stored in the memory 110 of the vehicle device 104 or a separate memory device installed in the vehicle 102. The distance value may be retrieved from the distance data set based on at least the third row of pixels.

The distance data set may be estimated by executing one or more calibration operations. For example, the plurality of rows of pixels (such as first plurality of rows of pixels) in the image (such as the first image 304) including the plurality of calibration lines may be identified. The first plurality of rows of pixels may correspond to the plurality of calibration lines. The first calibration line $c_1$ of the plurality of calibration lines is the known distance d from the second calibration line $c_2$ of the plurality of calibration lines. Further, the second distance x and the third distance y of the first and second calibration lines $c_1$ and $c_2$, respectively, from a second object of the calibration system may be estimated. The second distance x and the third distance y are estimated based on at least the known distance d, the first observed width $w_1$, and the second observed width $w_2$.

Further, the distance data set for the plurality of rows of pixels (such as the second plurality of rows of pixels) in the first image 304 may be estimated based on at least the width (such as the third width $w_3$) of the line (such as the third line) corresponding to each of the second plurality of rows of pixels and one of the first calibration line $c_1$ or the second calibration line $c_2$. The third width $w_3$ may be estimated based on at least the plurality of calibration lines and each row of pixels of the second plurality of rows of pixels. The distance data set may further include at least the second distance x and the third distance y. The first image 304 may comprise the first plurality of rows of pixels and the second plurality of rows of pixels. The retrieved distance value may be associated with the fourth row of pixels in the first image 304 having a row number that is equal to a row number of the third row of pixels in the second image 500. Upon prediction of the first distance of the first object from the vehicle 102, the processor 108 may be configured to generate the warning message based on at least the predicted distance. The processor 108 may be further configured to communicate the warning message to the driver of the vehicle 102 indicating the impending collision.

The disclosed embodiments encompass numerous advantages. The disclosure provides various methods and systems for predicting the first distance of the first object from the vehicle 102 based on the distance data set that is estimated in the calibration phase. The first and second rows of pixels $r_1$ and $r_2$ are identified by way of line correspondences (i.e., a line (such as the first and second calibration lines $c_1$ and $c_2$) on the ground plane is mapped to a row of pixels in an image (such as the first image 304)). Hence, the accuracy of identification of the first and second rows of pixels $r_1$ and $r_2$ is higher as compared to conventional distance prediction approaches that use point correspondences. Further, the calibration of the distance prediction mechanism is performed using a single frame (i.e., the first image 304 of the calibration system 300), thereby eliminating a need to have multiple frames (i.e., images) of a calibration system (e.g., the calibration system 300) for calibration. Further, based on the determined distance data set, the methods and the systems facilitate predicting far-away objects (e.g., objects at distances greater than 10 meters) with high accuracy. Further, since the distances of the distance data set may be estimated based on the plurality of calibration lines of the calibration system 300, and the distances of various objects (such as the first object) may be predicted based on the distance data set, a need for knowing actual dimensions of the various objects beforehand for predicting distances from the vehicle 102 is eliminated. Thus, the method and the system of the present disclosure provide a more efficient, a more effective, and a more accurate way of predicting the first distance of the first object as compared to a conventional approach of distance prediction.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for predicting the first distance of the first object from the vehicle 102. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   identifying, by circuitry, in a first image including at least a plurality of lines, a first plurality of rows of pixels corresponding to the plurality of lines, wherein a first line of the plurality of lines is at a known distance from a second line of the plurality of lines;
   estimating, by the circuitry, a first distance of the first line and a second distance of the second line, from an image-capturing device used for capturing the first image, wherein the first distance and the second distance are estimated based on at least the known distance, a first width of the first line in the first image, and a second width of the second line in the first image;
   estimating, by the circuitry, a third distance of a third line corresponding to each row of pixels of a second plurality of rows of pixels in the first image from the image-capturing device based on at least a focal length of the image-capturing device and a third width of the third line corresponding to each row of pixels of the second plurality of rows of pixels, wherein the third width is estimated based on at least the plurality of lines and each row of pixels of the second plurality of rows of pixels; and
   storing, by the circuitry in a memory, a distance data set including at least the first distance, the second distance, and the third distance, wherein a fourth distance of a first object from a second object is predicted based on the stored distance data set and a second image of the first object.

2. The method of claim 1, further comprising:
   converting, by the circuitry, the first image from a first color model to a second color model;
   filtering, by the circuitry, the converted first image to obtain a filtered first image including a known color; and
   identifying, by the circuitry, the first plurality of rows of pixels from the filtered first image.

3. The method of claim 2, wherein the first and second color models are at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model, and wherein the first color model is different from the second color model.

4. The method of claim 1, further comprising:
estimating, by the circuitry, the focal length of the image-capturing device based on at least one of the first line or the second line.

5. The method of claim 1, wherein the first image comprises the first and second pluralities of rows of pixels.

6. The method of claim 1, further comprising:
detecting, by the circuitry, a bottom edge of the first object based on the second image;
identifying, by the circuitry, a third row of pixels in the second image corresponding to the detected bottom edge; and
retrieving, by the circuitry from the memory, a distance value corresponding to a fourth row of pixels associated with the first image based on the third row of pixels, wherein the retrieved distance value indicates the fourth distance of the first object from the second object, and wherein a row number of the third row of pixels is equal to a row number of the fourth row of pixels.

7. A method, comprising:
capturing, by an image-capturing device of a vehicle device installed in a vehicle, a first image of a first object;
detecting, by a processor of the vehicle device, a bottom edge of the first object based on the first image;
identifying, by the processor, a first row of pixels in the first image corresponding to the detected bottom edge; and
predicting, by the processor, a first distance of the first object from the vehicle based on a distance value, wherein the distance value is retrieved, based on the first row of pixels, from a distance data set stored in a memory of the vehicle device, and wherein the stored distance data set is estimated using steps comprising:
identifying, in a second image including at least a plurality of lines, a second plurality of rows of pixels corresponding to the plurality of lines, wherein a first line of the plurality of lines is at a known distance from a second line of the plurality of lines;
estimating a second distance of the first line and a third distance of the second line, from a second object, wherein the second distance and the third distance are estimated based on at least the known distance, a first width of the first line in the second image, and a second width of the second line in the second image; and
estimating the distance data set of a third line corresponding to each row of pixels of a third plurality of rows of pixels in the second image from the second object based on at least a third width of the third line corresponding to each row of pixels of the third plurality of rows of pixels and one of the first line or the second line, wherein the distance data set further includes at least the second distance and the third distance.

8. The method of claim 7, wherein the second plurality of rows of pixels are identified using steps comprising:
converting the second image from a first color model to a second color model;
filtering the converted second image to obtain a filtered image including a known color; and
identifying the second plurality of rows of pixels from the filtered second image.

9. The method of claim 8, wherein the first and second color models are at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model, and wherein the first color model is different from the second color model.

10. The method of claim 7, wherein the second image comprises the second and third pluralities of rows of pixels.

11. The method of claim 7, wherein the third width is estimated based on at least the plurality of lines and each row of pixels of the third plurality of rows of pixels.

12. The method of claim 7, wherein the retrieved distance value is associated with a fourth row of pixels in the second image, and wherein a row number of the first row of pixels in the first image is equal to a row number of the fourth row of pixels in the second image.

13. The method of claim 7, further comprising:
generating, by the processor, a warning message based on at least the first distance of the first object from the vehicle; and
communicating, by the processor to a driver of the vehicle, the warning message indicating an impending collision.

14. A system, comprising:
an image-capturing device configured to:
capture a first image of a first object; and
a processor configured to:
detect a bottom edge of the first object based on the first image;
identify a first row of pixels in the first image corresponding to the detected bottom edge; and
predict a first distance of the first object from a vehicle based on a distance value, wherein the distance value is retrieved, based on the first row of pixels, from a distance data set stored in a memory, and wherein the stored distance data set is estimated using steps comprising:
identifying, in a second image including at least a plurality of lines, a second plurality of rows of pixels corresponding to the plurality of lines, wherein a first line of the plurality of lines is at a known distance from a second line of the plurality of lines;
estimating a second distance of the first line and a third distance of the second line, from a second object, wherein the second distance and the third distance are estimated based on at least the known distance, a first width of the first line in the second image, and a second width of the second line in the second image; and
estimating the distance data set of a third line corresponding to each row of pixels of a third plurality of rows of pixels in the second image from the second object based on at least a third width of the third line corresponding to each row of pixels of the third plurality of rows of pixels and one of the first line or the second line, wherein the distance data set further includes at least the second distance and the third distance.

15. The system of claim 14, wherein the second plurality of rows of pixels are identified using steps comprising:
- converting the second image from a first color model to a second color model;
- filtering the converted second image to obtain a filtered second image including a known color; and
- identifying the second plurality of rows of pixels from the filtered second image.

16. The system of claim 15, wherein the first and second color models are at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model, and wherein the first color model is different from the second color model.

17. The system of claim 14, wherein the second image comprises the second and third pluralities of rows of pixels.

18. The system of claim 14, wherein the third width is estimated based on at least the plurality of lines and each row of pixels of the third plurality of rows of pixels.

19. The system of claim 14, wherein the retrieved distance value is associated with a fourth row of pixels in the second image, and wherein a row number of the first row of pixels in the first image is equal to a row number of the fourth row of pixels in the second image.

20. The system of claim 14, wherein the processor is further configured to:
- generate a warning message based on at least the first distance of the first object from the vehicle; and
- communicate the warning message to a driver of the vehicle indicating an impending collision.

\* \* \* \* \*